US011929200B2

(12) United States Patent
Lee et al.

(10) Patent No.: US 11,929,200 B2
(45) Date of Patent: Mar. 12, 2024

(54) COIL COMPONENT AND BOARD HAVING THE SAME MOUNTED THEREON

(71) Applicant: SAMSUNG ELECTRO-MECHANICS CO., LTD., Suwon-si (KR)

(72) Inventors: Dong Hwan Lee, Suwon-si (KR); Sang Soo Park, Suwon-si (KR); Chan Yoon, Suwon-si (KR); Dong Jin Lee, Suwon-si (KR); Hwi Dae Kim, Suwon-si (KR); Hye Mi Yoo, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 583 days.

(21) Appl. No.: 17/117,219

(22) Filed: Dec. 10, 2020

(65) Prior Publication Data

US 2022/0076881 A1 Mar. 10, 2022

(30) Foreign Application Priority Data

Sep. 10, 2020 (KR) ........................ 10-2020-0115983

(51) Int. Cl.
*H01F 27/28* (2006.01)
*H01F 17/00* (2006.01)
(Continued)

(52) U.S. Cl.
CPC ....... *H01F 27/292* (2013.01); *H01F 17/0013* (2013.01); *H01F 17/045* (2013.01); *H01F 27/2804* (2013.01)

(58) Field of Classification Search
CPC .. H01F 27/292; H01F 17/0013; H01F 17/045; H01F 27/2804; H01F 2017/048; H01F 19/04; H01F 27/28; H01F 27/29; H01F 27/306; H01F 27/33; H01F 2027/065; H01F 27/02; H01F 27/2823; H01F 27/2871; H01F 2017/002; H01F 17/04; H05K 1/181
(Continued)

(56) References Cited

U.S. PATENT DOCUMENTS

2016/0078986 A1* 3/2016 Yoon ......................... H01F 5/04 336/83
2016/0078994 A1* 3/2016 Yoon ......................... H01F 5/00 336/200
(Continued)

FOREIGN PATENT DOCUMENTS

JP 2006-54207 A 2/2006
JP 2017-147321 A 8/2017
(Continued)

*Primary Examiner* — Shawki S Ismail
*Assistant Examiner* — Kazi S Hossain
(74) *Attorney, Agent, or Firm* — MORGAN, LEWIS & BOCKIUS LLP

(57) ABSTRACT

A coil component includes a body; first and second coil portions spaced apart from each other in the body; first and second external electrodes disposed on the body to be spaced apart from each other and connected to both ends of the first coil portion; and first and second ground electrodes spaced apart from each other on the body and connected to both ends of the second coil portion.

19 Claims, 24 Drawing Sheets

(51) Int. Cl.
*H01F 17/04* (2006.01)
*H01F 27/29* (2006.01)

(58) Field of Classification Search
USPC .......................................... 336/200, 232, 192
See application file for complete search history.

(56) References Cited

U.S. PATENT DOCUMENTS

| | | | | |
|---|---|---|---|---|
| 2016/0078995 | A1* | 3/2016 | Yoon | H01F 17/0013 336/200 |
| 2017/0179913 | A1* | 6/2017 | Song | H01F 27/292 |
| 2019/0180913 | A1* | 6/2019 | Moon | H01F 27/2804 |
| 2022/0037239 | A1* | 2/2022 | Lin | H01L 23/49555 |

FOREIGN PATENT DOCUMENTS

| | | | |
|---|---|---|---|
| KR | 10-2217291 | B1 | 2/2021 |
| KR | 10-2253471 | B1 | 5/2021 |

* cited by examiner

COIL COMPONENT AND BOARD HAVING THE SAME MOUNTED THEREON

CROSS-REFERENCE TO RELATED APPLICATION(S)

This application claims the benefit of priority to Korean Patent Application No. 10-2020-0115983 filed on Sep. 10, 2020 in the Korean Intellectual Property Office, the disclosure of which is incorporated herein by reference in its entirety.

TECHNICAL FIELD

The present disclosure relates to a coil component and a board having the same mounted thereon.

BACKGROUND

An inductor, a coil component, may be a typical passive electronic component used in electronic devices, along with a resistor and a capacitor. In the coil component, there may be an array-type coil component including a plurality of coil portions in a single component to reduce a mounting area.

The array-type coil component may have a non-coupled inductor shape, a coupled inductor shape, or a combination of the above shapes, depending on a coupling coefficient or mutual inductance between a plurality of coil portions.

Many applications do not require a non-coupled inductor, i.e., require a coupled inductor having a coupling coefficient of 0.1 to 0.9 and having some degree of leakage inductance, and it is necessary to control the coupling coefficient for an application.

Meanwhile, as electronic devices are gradually higher in performance and smaller in size, electronic components used in the electronic devices are increasing in number, smaller in size, and increasing in operating frequency. For this reason, possibility of occurrence of a problem due to high-frequency noise of the array-type coil component is increasing.

SUMMARY

An aspect of the present disclosure is to provide an array-type coil component capable of easily removing high-frequency noise.

According to an aspect of the present disclosure, a coil component includes a body; first and second coil portions spaced apart from each other in the body; first and second external electrodes disposed on the body to be spaced apart from each other and connected to both ends of the first coil portion; and first and second ground electrodes spaced apart from each other on the body and connected to both ends of the second coil portion.

According to another aspect of the present disclosure, a board having a coil component mounted thereon includes a printed circuit board including a ground pad and a signal pad; and a coil component disposed on the printed circuit board, wherein the coil component comprises: a body; first and second coil portions spaced apart from each other in the body; first and second external electrodes disposed on the body to be spaced apart from each other and connecting both ends of the first coil portion and the signal pad; and first and second ground electrodes spaced apart from each other on the body and connecting both ends of the second coil portion and the ground pad.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
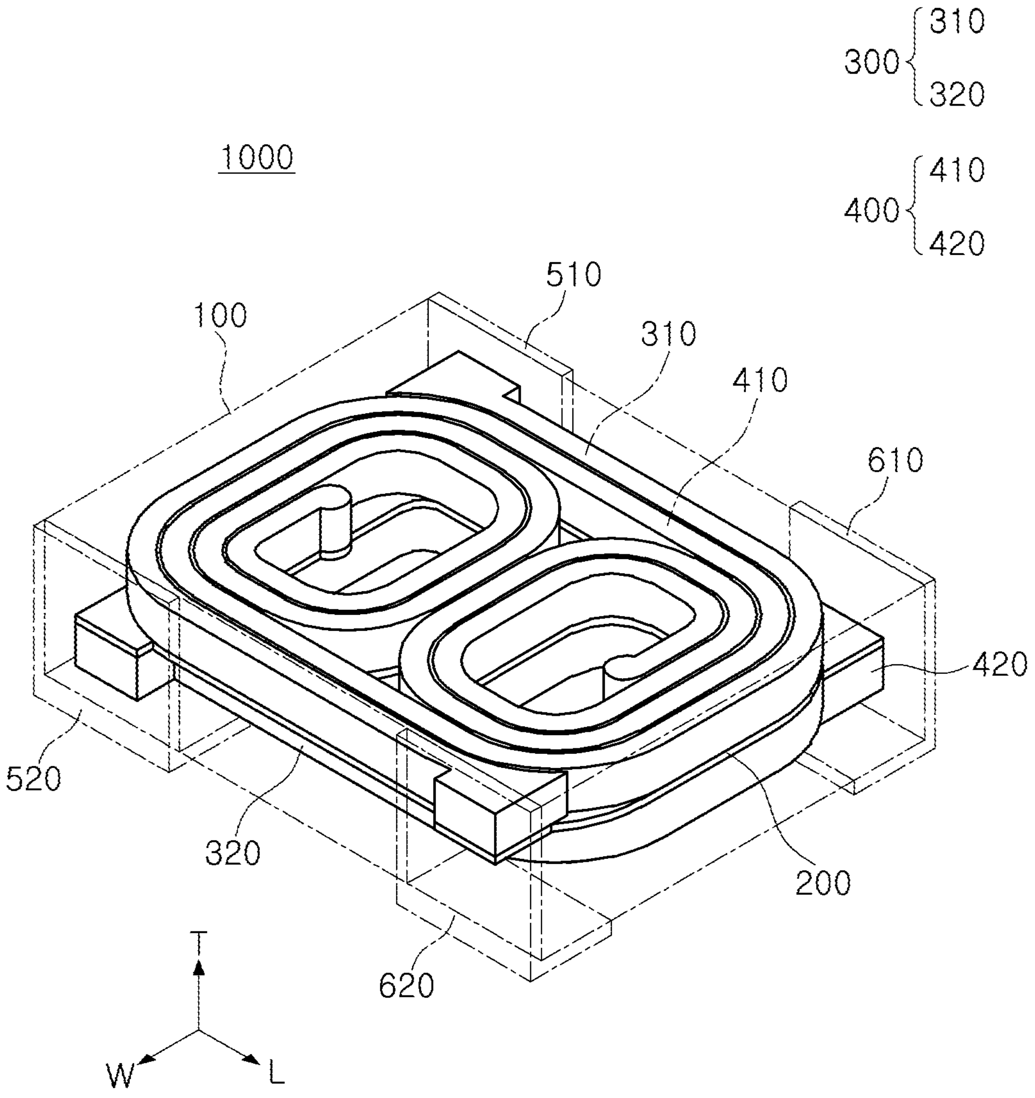
FIG. 1 is a view schematically illustrating a coil component according to a first embodiment of the present disclosure.

The terms used in the description of the present disclosure are used to describe a specific embodiment, and are not intended to limit the present disclosure. A singular term includes a plural form unless otherwise indicated. The terms "include," "comprise," "is configured to," etc. of the description of the present disclosure are used to indicate the presence of features, numbers, steps, operations, elements, parts, or combination thereof, and do not exclude the possibilities of combination or addition of one or more additional features, numbers, steps, operations, elements, parts, or combination thereof. Also, the terms "disposed on," "positioned on," and the like, may indicate that an element is positioned on or beneath an object, and does not necessarily mean that the element is positioned above the object with reference to a gravity direction.

The term "coupled to," "combined to," and the like, may not only indicate that elements are directly and physically in contact with each other, but also include the configuration in which another element is interposed between the elements such that the elements are also in contact with the other component.

Sizes and thicknesses of elements illustrated in the drawings are indicated as examples for ease of description, and the present disclosure are not limited thereto.

In the drawings, an L direction is a first direction or a length direction, a W direction is a second direction or a width direction, a T direction is a third direction or a thickness direction.

Hereinafter, a coil component according to an embodiment of the present disclosure will be described in detail with reference to the accompanying drawings. Referring to the accompanying drawings, the same or corresponding components may be denoted by the same reference numerals, and overlapped descriptions will be omitted.

In electronic devices, various types of electronic components may be used, and various types of coil components may be used between the electronic components to remove noise, or for other purposes.

In other words, in electronic devices, a coil component may be used as a power inductor, a high frequency (HF) inductor, a general bead, a high frequency (GHz) bead, a common mode filter, and the like.

(Coil Component)

Figure 2:
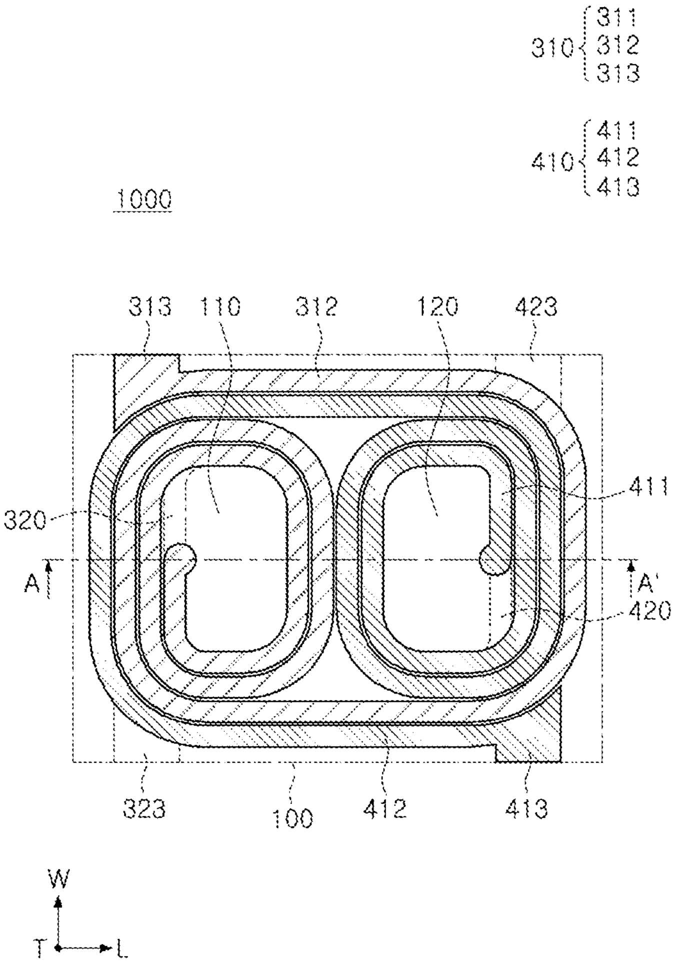
FIG. 2 is a view illustrating the coil component of FIG. 1, when viewed from above.
Figure 2B:
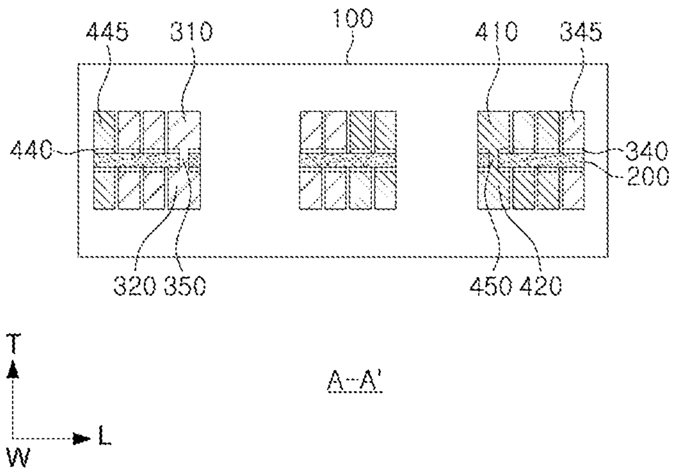
FIG. 2B is a cross-section view along line A-A shown in FIG. 2.

FIG. 1 is a view schematically illustrating a coil component according to a first embodiment of the present disclosure. FIG. 2 is a view illustrating the coil component of FIG. 1, when viewed from above.

Referring to FIGS. 1 and 2, a coil component 1000 according to this embodiment may include a body 100, a support substrate 200, a first coil portion 300, a second coil portion 400, external electrodes 510 and 520, and ground electrodes 610 and 620.

The body 100 may form an exterior of the coil component 1000 according to this embodiment, and the support substrate 200, the first coil portion 300, and the second coil portion 400 may be embedded therein.

The body 100 may be formed in a hexahedral shape as a whole.

Referring to FIG. 1, the body 100 may include a first surface and a second surface facing each other in a longitudinal direction L, a third surface and a fourth surface facing each other in a width direction W, and a fifth surface and a sixth surface facing each other in a thickness direction T. Each of the first to fourth surfaces of the body 100 may correspond to wall surfaces of the body 100 connecting the fifth surface and the sixth surface of the body 100. Hereinafter, both end surfaces of the body 100 may refer to the first surface and the second surface of the body, and both side surfaces of the body 100 may refer to the third surface and the fourth surface of the body. Further, one surface of the body 100 may refer to the sixth surface of the body 100, and the other surface of the body 100 may refer to the fifth surface of the body 100. In addition, hereinafter, upper and lower surfaces of the body 100 may refer to the fifth and sixth surfaces of the body 100, respectively, based on the directions of FIG. 1.

The body 100 may include a magnetic material and a resin. Specifically, the body 100 may be formed by stacking one or more magnetic composite sheets including a resin and a magnetic material dispersed in the resin. The body 100 may have a structure other than a structure in which the magnetic material is dispersed in the resin. For example, the body 100 may be made of a magnetic material such as ferrite.

The magnetic material may be a ferrite powder or a magnetic metal powder.

Examples of the ferrite powder may include at least one or more of spinel type ferrites such as Mg—Zn-based ferrite, Mn—Zn-based ferrite, Mn—Mg-based ferrite, Cu—Zn-based ferrite, Mg—Mn—Sr-based ferrite, Ni—Zn-based ferrite, and the like, hexagonal ferrites such as Ba—Zn-based ferrite, Ba—Mg-based ferrite, Ba—Ni-based ferrite, Ba—Co-based ferrite, Ba—Ni—Co-based ferrite, and the like, garnet type ferrites such as Y-based ferrite, and the like, and Li-based ferrites.

The magnetic metal powder may include at least one of iron (Fe), silicon (Si), chromium (Cr), cobalt (Co), molybdenum (Mo), aluminum (Al), niobium (Nb), copper (Cu), and nickel (Ni), and alloys thereof. For example, the magnetic metal powder may be at least one or more of a pure iron powder, a Fe—Si-based alloy powder, a Fe—Si—Al-based alloy powder, a Fe—Ni-based alloy powder, a Fe—Ni—Mo-based alloy powder, a Fe—Ni—Mo—Cu-based alloy powder, a Fe—Co-based alloy powder, a Fe—Ni—Co-based alloy powder, a Fe—Cr-based alloy powder, a Fe—Cr—Si-based alloy powder, a Fe—Si—Cu—Nb-based alloy powder, a Fe—Ni—Cr-based alloy powder, and a Fe—Cr—Al-based alloy powder.

The metallic magnetic powder may be amorphous or crystalline. For example, the magnetic metal powder may be a Fe—Si—B—Cr-based amorphous alloy powder, but is not limited thereto.

The ferrite powder and the magnetic metal powder may have an average diameter of about 0.1 μm to 30 μm, respectively, but are not limited thereto.

The body 100 may include two or more types of magnetic materials dispersed in the insulating resin. In this case, the term "different types of magnetic materials" means that magnetic materials dispersed in an insulating resin are distinguished from each other by an average diameter, a composition, a crystallinity, and a shape.

The resin may include an epoxy, a polyimide, a liquid crystal polymer, or the like, in a single form or in combined forms, but is not limited thereto.

The body 100 may include a first core 110 passing through the support substrate 200 and the first coil portion 300, and a second core 120 passing through the support substrate 200 and the second coil portion 400. The cores 110 and 120 may be formed by filling a through-hole of each of the first and second coil portions 300 and 400 with a magnetic composite sheet in a process of stacking and curing the magnetic composite sheet, but is not limited thereto.

The support substrate 200 may be embedded in the body 100. The support substrate 200 may be configured to support the coil portions 300 and 400 to be described later.

The support substrate 200 may be formed of an insulating material including a thermosetting insulating resin such as an epoxy resin, a thermoplastic insulating resin such as a polyimide, or a photosensitive insulating resin, or may be formed of an insulating material in which a reinforcing material such as a glass fiber or an inorganic filler is impregnated with such an insulating resin. For example, the support substrate 200 may be formed of an insulating material such as prepreg, Ajinomoto Build-up Film (ABF), FR-4, a bismaleimide triazine (BT) film, a photoimageable dielectric (PID) film, and the like, but are not limited thereto.

As the inorganic filler, at least one or more selected from a group consisting of silica ($SiO_2$), alumina ($Al_2O_3$), silicon carbide (SiC), barium sulfate ($BaSO_4$), talc, mud, a mica powder, aluminium hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide better rigidity. When the support substrate 200 is formed of an insulating material not containing glass fibers, the support substrate 200 may be advantageous for reducing a thickness of a component. When the support substrate 200 is formed of an insulating material including a photosensitive insulating resin, the number of processes for forming the coil portions 300 and 400 may be reduced, to be advantageous in reducing production costs and forming a fine via.

The first and second coil portions 300 and 400 may be disposed on the support substrate 200 to be spaced apart from each other, to express characteristics of a coil component 1000 according to this embodiment. For example, a coil component 1000 according to this embodiment may be a coupled inductor in which an absolute value of a coupling coefficient k between the first and second coil portions 300 and 400 may be greater than 0 and less than 1, but is not limited thereto.

The first coil portion 300 may include a first winding portion 311 wound around the first core 110, and a first extended portion 312 surrounding all of the first and second cores 110 and 120. The second coil portion 400 may include a second winding portion 411 wound around the second core 120, and a second extended portion 412 surrounding all of the first and second cores 110 and 120. A winding direction of the first winding portion 311 and a winding direction of the first extended portion 312 may be the same, and a winding direction of the second winding portion 411 and a winding direction of the second extended portion 412 may be the same. For example, for example, since a winding direction of the first winding portion 311 and a winding direction of the first extended portion 312 of the first coil portion 300 are the same, when a signal is transmitted to the first coil portion 300 from the first external electrode 510, a direction of magnetic flux induced from the first winding portion 311 and a direction of magnetic flux induced from the first extended portion 312 may be the same.

Referring to FIGS. 1 and 2, the first coil portion 300 may include a first upper coil pattern 310 disposed on an upper surface of the support substrate 200, a first lower coil pattern 320 disposed on a lower surface of the support substrate 200, and a first via 350 passing through the support substrate 200 and connecting the first upper coil pattern 310 and the first lower coil pattern 320, based on the direction of FIG. 1. The first upper coil pattern 310 may have a first upper winding portion 311 forming at least one turn around the first core 110, a first upper extended portion 312 extending from one end portion of the first upper winding portion 311 to surround the first and second cores 110 and 120 and having the one end portion disposed closer to a surface of the body 100 than an outermost turn of the first upper winding portion 311, and a first upper lead-out portion 313 extending from the first upper extended portion 312 and exposed from one side surface of the body 100. The first lower coil pattern 320 may have a first lower winding portion forming at least one turn around the first core 110, a first lower extended portion extending from one end portion of the first lower winding portion to surround the first and second cores 110 and 120 and having the one end portion disposed closer to a surface of the body 100 than an outermost turn of the first lower winding portion, and a first lower lead-out portion 323 extending from the first lower extended portion and exposed from the other side surface of the body 100. The other end portion of the first upper winding portion 311 and the other end portion of the first lower winding portion may be in contact with and connected to the first via 350, respectively. First and second external electrodes 510 and 520 to be described later may be arranged on one side surface and the other side surface of the body 100, and may be connected to the first upper lead-out portion 313 and the first lower lead-out portion 323, respectively. By doing so, the first coil portion 300 may function as a single coil extending from the first upper lead-out portion 313 to the first lower lead-out portion 323.

Specifically, referring to FIGS. 1 and 2, the second coil portion 400 may include a second upper coil pattern 410 disposed on the upper surface of the support substrate 200, a second lower coil pattern 420 disposed on the lower surface of the support substrate 200, and a second via 450 passing through the support substrate 200 and connecting the second upper coil pattern 410 and the second lower coil pattern 420, based on the direction of FIG. 1. The second upper coil pattern 410 may have a second upper winding portion 411 forming at least one turn around the second core 120, a second upper extended portion 412 extending from one end portion of the second upper winding portion 411 to surround the first and second cores 110 and 120 and having the one end portion disposed closer to a surface of the body 100 than an outermost turn of the second upper winding portion 411, and a second upper lead-out portion 413 extending from the second upper extended portion 412 and exposed from the other side surface of the body 100. The second lower coil pattern 420 may have a second lower winding portion forming at least one turn around the second core 120, a second lower extended portion extending from one end portion of the second lower winding portion to surround the first and second cores 110 and 120 and having the one end portion disposed closer to a surface of the body 100 than an outermost turn of the second lower winding portion, and a second lower lead-out portion 423 extending from the second lower extended portion and exposed from the other side surface of the body 100. The other end portion of the second upper winding portion 411 and the other end portion of the second lower winding portion may be in contact with and connected to the second via 450, respectively. First and second ground electrodes 610 and 620 to be described later may be arranged on the one side surface and the other side surface of the body 100, and may be connected to the second upper lead-out portion 413 and the second lower lead-out portion 423, respectively. By doing so, the second coil portion 400 may function as a single coil extending from the second upper lead-out portion 413 to the second lower lead-out portion 423. The first and second ground electrodes 610 and 620 may be respectively connected to a ground pad of a printed circuit board to be described later. As a result, the second coil portion 400 may be short-circuited with a ground of the printed circuit board. This will be described in detail later.

Referring to FIGS. 1 and 2, the second upper extended portion 412 of the second coil portion 400 may be disposed between the outermost turn of the first upper winding portion 311 of the first coil portion 300 and the first upper extended portion 312 of the first coil portion 300, in a region close to the one side surface of the body 100. Similarly, the first upper extended portion 312 of the first coil portion 300 may be disposed between the outermost turn of the second upper winding portion 411 of the second coil portion 400 and the second upper extended portion 412 of the second coil portion 400, in a region close to the other side surface of the body 100. For example, the first and second coil portions 300 and 400 may be arranged to have a structure in which each turns are alternately disposed, to facilitate electromagnetic coupling between the first and second coil portions 300 and 400. In this embodiment, the coupling coefficient k between the first and second coil portions 300 and 400 may be −0.4. When the coupling coefficient has a negative sign, it may mean that phases of the signals may be opposite to each other.

Each of the first and second coil portions 300 and 400 may include a seed layer 340, 440, contacting the support substrate 200 and a plating layer 345, 445 disposed on the seed layer. For example, the first and second coil portions 300 and 400 applied to this embodiment may be thin film type coils formed by a plating method.

The seed layer may be formed by a thin film process such as sputtering, or an electroless plating process. When the seed layer is formed by a thin film process such as sputtering, at least a portion of a material constituting the seed layer may be configured to be infiltrated into a surface of the support substrate 200. This may confirm that a concentration of a metal material constituting the seed layer in the support substrate 200 differs in the thickness direction T of the body 100.

A thickness of the seed layer may be 1.5 μm or more and 3 μm or less. When the thickness of the seed layer is less than 1.5 μm, it may be difficult to implement the seed layer, and plating defects may occur in a subsequent process. When the thickness of the seed layer is more than 3 μm, it may be difficult to form a relatively large volume of the plating layer within the limited volume of the body 100, and time for processing may increase.

A via may include at least one or more conductive layers. For example, when the via is formed by electroplating, the via may include a seed layer formed on an inner wall of a via hole passing through the support substrate 200, and an electroplating layer filling the via hole in which the seed layer is formed. The seed layer of the via may be formed in the same process as the seed layer of the first and second coil portions 300 and 400 together, to be integrally formed with each other, or may be formed in different processes from the seed layer of the first and second coil portions 300 and 400, to form a boundary therebetween. The electroplating layer of the via may be formed in the same process as the plating layer of the first and second coil portions 300 and 400 together, to be integrally formed with each other, or may be formed in different processes from the plating layer of the first and second coil portions 300 and 400, to form a boundary therebetween.

When line widths of the coil patterns 310, 320, 410, and 420 are relatively large, a volume of a magnetic material in the body 100 may be reduced, to deteriorate characteristics of a component. As an example, not limited, a ratio of thickness to width of each turn of the coil patterns 310, 320, 410, and 420, based on a cross-section in the width (W)-thickness (T) direction, e.g., an aspect ratio (AR) may be 3:1 to 9:1.

The coil patterns 310, 320, 410, and 420, and vias may be formed of a conductive material such as copper (Cu), aluminum (Al), silver (Ag), tin (Sn), gold (Au), nickel (Ni), lead (Pb), titanium (Ti), chromium (Cr), or alloys thereof, respectively, but are not limited thereto. As a non-limiting example, the seed layer may include at least one of molybdenum (Mo), chromium (Cr), copper (Cu), or titanium (Ti), and the plating layer may include copper (Cu).

The first and second external electrodes 510 and 520 may be respectively disposed on the one side surface and the other side surface of the body 100 to be spaced apart from each other, and may be connected to both ends of the first coil portion 300. For example, the first external electrode 510 may be disposed on the one side surface of the body 100, and may be in contact with the first upper lead-out portion 313 of the first coil portion 300 exposed from the one side surface of the body 100. The second external electrode 520 may be disposed on the other side surface of the body 100, and may be in contact with the first lower lead-out portion 323 of the first coil portion 300 exposed from the other side surface of the body 100. The first and second external electrodes 510 and 520 may be respectively connected to signal pads of a printed circuit board to be described later, transmit signals of the printed circuit board to the first coil portion 300.

The first and second ground electrodes 610 and 620 may be respectively disposed on the one side surface and the other side surface of the body 100 to be spaced apart from each other, and may be connected to both ends of the second coil portion 400. For example, the first ground electrode 610 may be disposed on one side surface of the body 100, and may be in contact with the second lower lead-out portion 423 of the second coil portion 300 exposed from the one side surface of the body 100. The second ground electrode 620 may be disposed on the other side surface of the body 100, and may be in contact with the second upper lead-out portion 413 of the second coil portion 400 exposed from the other side surface of the body 100. The first and second ground electrodes 610 and 620 may be respectively connected to ground pads of a printed circuit board to be described later, and may short-circuit the second coil portion 400 with grounds of the printed circuit board.

The first and second external electrodes 510 and 520 and the first and second ground electrodes 610 and 620 may be formed of a conductive material such as copper (Cu), aluminum (Al), silver (Ag), tin (Sn), gold (Au), nickel (Ni), lead (Pb), titanium (Ti), or alloys thereof, respectively, but are not limited thereto.

The first and second external electrodes 510 and 520 and the first and second ground electrodes 610 and 620 may be formed in a single-layer structure or a multilayer structure, respectively. As an example, the first external electrode 510 may be composed of a first layer including copper, a second layer disposed on the first layer and including nickel (Ni), and a third layer disposed on the second layer and including tin (Sn). In this case, the first to third layers may be formed by plating, respectively, but are not limited thereto. As another example, the first external electrode 510 may include a resin electrode layer including conductive powder and a resin, and a plating layer formed by plating on the resin electrode layer. In this case, the resin electrode layer may include a cured product of at least one conductive powder of copper (Cu) and silver (Ag) and a thermosetting resin. In addition, the plating layer may include a first plating layer including nickel (Ni) and a second plating layer including tin (Sn). When the resin included in the resin electrode layer includes the same resin as the insulating resin of the body 100, bonding force between the resin electrode layer and the body 100 may be improved.

Although not illustrated, when the body 100 includes a conductive magnetic material, the coil component 1000 may further include an insulating layer disposed on surfaces of the first and second coil portions 300 and 400.

Figure 3A:
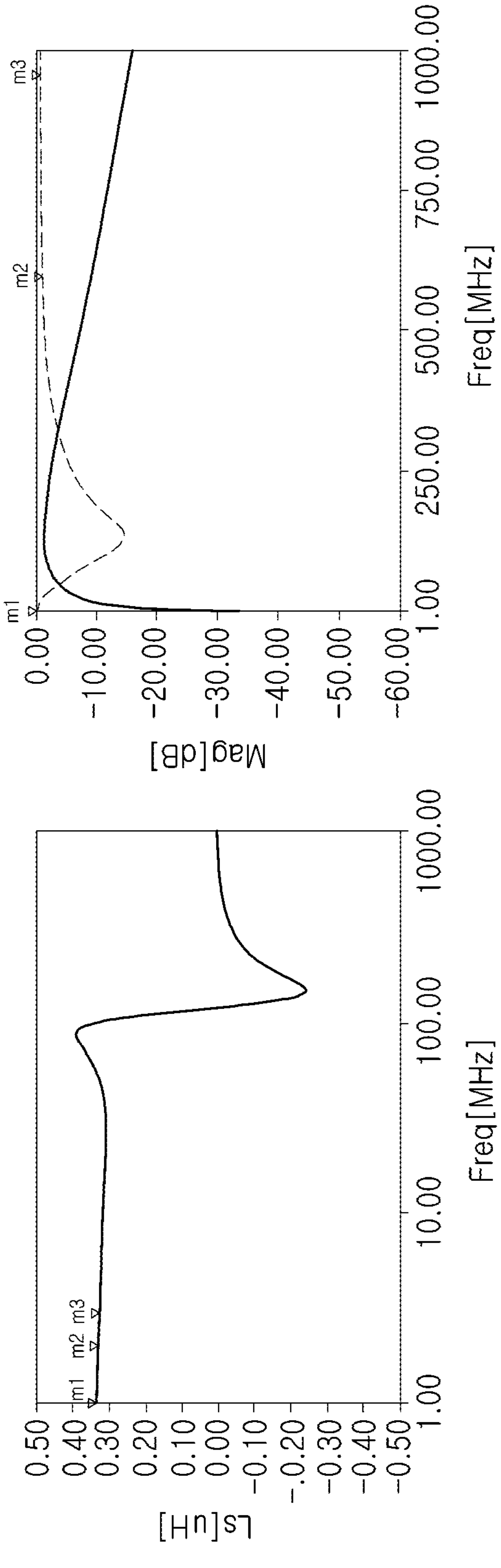
FIG. 3A is a graph illustrating a change in inductance for each frequency and transmission and reflection characteristics of a signal for each frequency, when a second coil portion of the coil component of FIG. 1 is open.
Figure 3B:
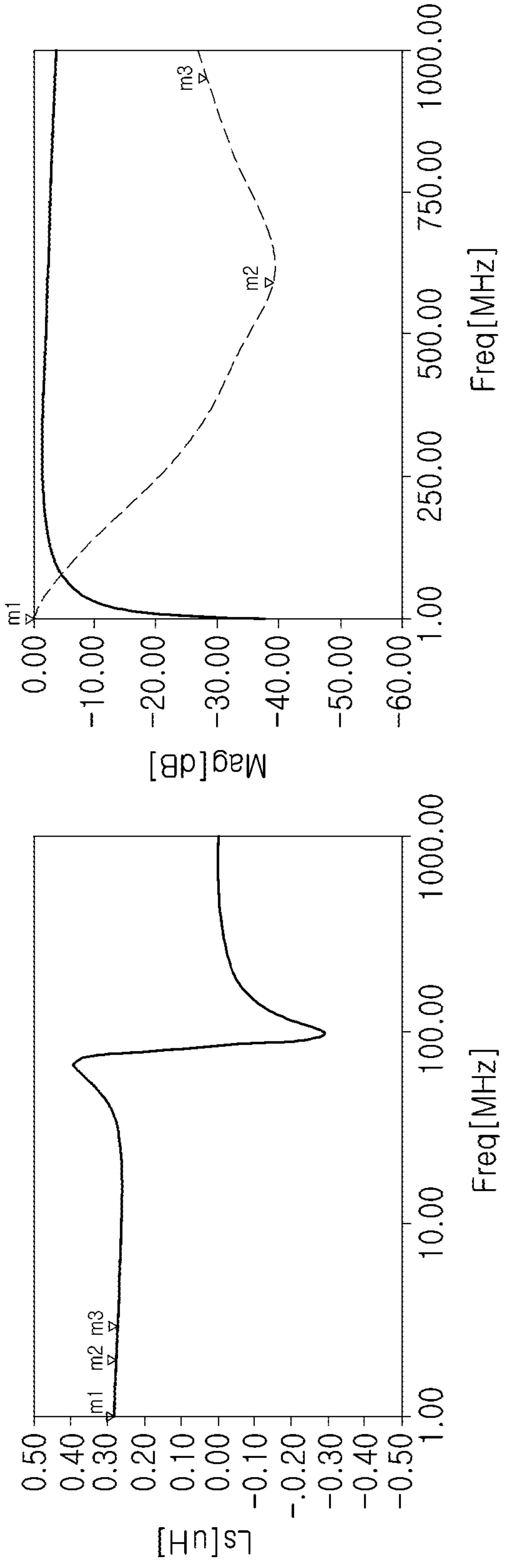
FIG. 3B is a graph illustrating a change in inductance for each frequency and transmission and reflection characteristics of a signal for each frequency, when a second coil portion of the coil component of FIG. 1 is short-circuited with a ground of a printed circuit board.
Figure 16:
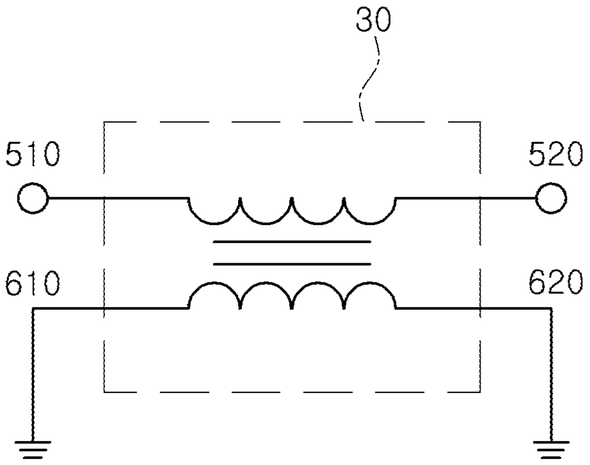
FIG. 16 is a view schematically illustrating a circuit to which a coil component of the present disclosure is applied.

FIG. 3A is a view illustrating a change in inductance for each frequency and transmission and reflection characteristics of a signal for each frequency, when a second coil portion of the coil component of FIG. 1 is open. FIG. 3B is a view illustrating a change in inductance for each frequency and transmission and reflection characteristics of a signal for each frequency, when a second coil portion of the coil component of FIG. 1 is short-circuited with a ground of a printed circuit board. FIG. 16 is a view schematically illustrating a circuit to which a coil component of the present disclosure is applied. FIG. 16 illustrates that the second coil portion 400 is connected to the ground of the printed circuit board, as illustrated in FIG. 3B.

Table 1 below illustrates a change in inductance for each frequency of the first coil portion 300 when the second coil portion 400 is open (a left side view of FIG. 3A), and illustrates a change in inductance for each frequency of the first coil portion 300 when the second coil portion 400 is short-circuited with the ground (a left side view of FIG. 3B), in this embodiment in which coupling coefficients of the first and second coil portions 300 and 400 are −0.4.

Table 2 below illustrates signal transmission characteristics (S21) for each frequency of the first coil portion 300 when the second coil portion 400 is open (a dotted line in a right side view of FIG. 3A), and illustrates signal transmission characteristics (S21) for each frequency of the first coil portion 300 when the second coil portion 400 is short-circuited with the ground (a dotted line in a right side view in FIG. 3B), in this embodiment in which coupling coefficients of the first and second coil portions 300 and 400 are −0.4.

TABLE 1

| | L (μH) | |
|---|---|---|
| | Second Coil Portion (Open) | Second Coil Portion (Short-Circuited with Ground) |
| 1 MHZ (m1) | 0.3349 | 0.2804 |
| 2 MHZ (m2) | 0.3308 | 0.2767 |
| 3 MHZ (m3) | 0.3276 | 0.2738 |

TABLE 2

| | S21 (dB) | |
|---|---|---|
| | Second Coil Portion (Open) | Second Coil Portion (Short-Circuited with Ground) |
| 1 MHZ (m1) | −0.012 | −0.0090 |
| 600 MHZ (m2) | −1.3257 | −38.9411 |
| 960 MHz (m3) | −0.9557 | −28.2389 |

Referring to the left side views in FIGS. 3A and 3B and Table 1, when coupling coefficients of the first and second coil portions 300 and 400 are −0.4, it can be seen that capacitance of the coil component in a case in which the second coil portion 400 is open was slightly lowered at the same frequency, as compared to a case in which the second coil portion 400 is short-circuited with the ground.

Referring to the right side views in FIGS. 3A and 3B and Table 2, when coupling coefficients of the first and second coil portions 300 and 400 are −0.4, it can be seen that a high frequency signal of 500 MHz or higher of the coil component in a case in which the second coil portion 400 is short-circuited with the ground was not transmitted, as compared to a case in which the second coil portion 400 is open. For example, in this embodiment, it can be seen that the second coil portion 400, among the first and second coil portions 300 and 400 disposed in the array-type coil component, may be short-circuited with a ground, to remove a high frequency noise signal with only a single component without using a separate noise filter, etc. This is because the first and second coil portions 300 and 400 may be magnetically coupled.

Figure 4:
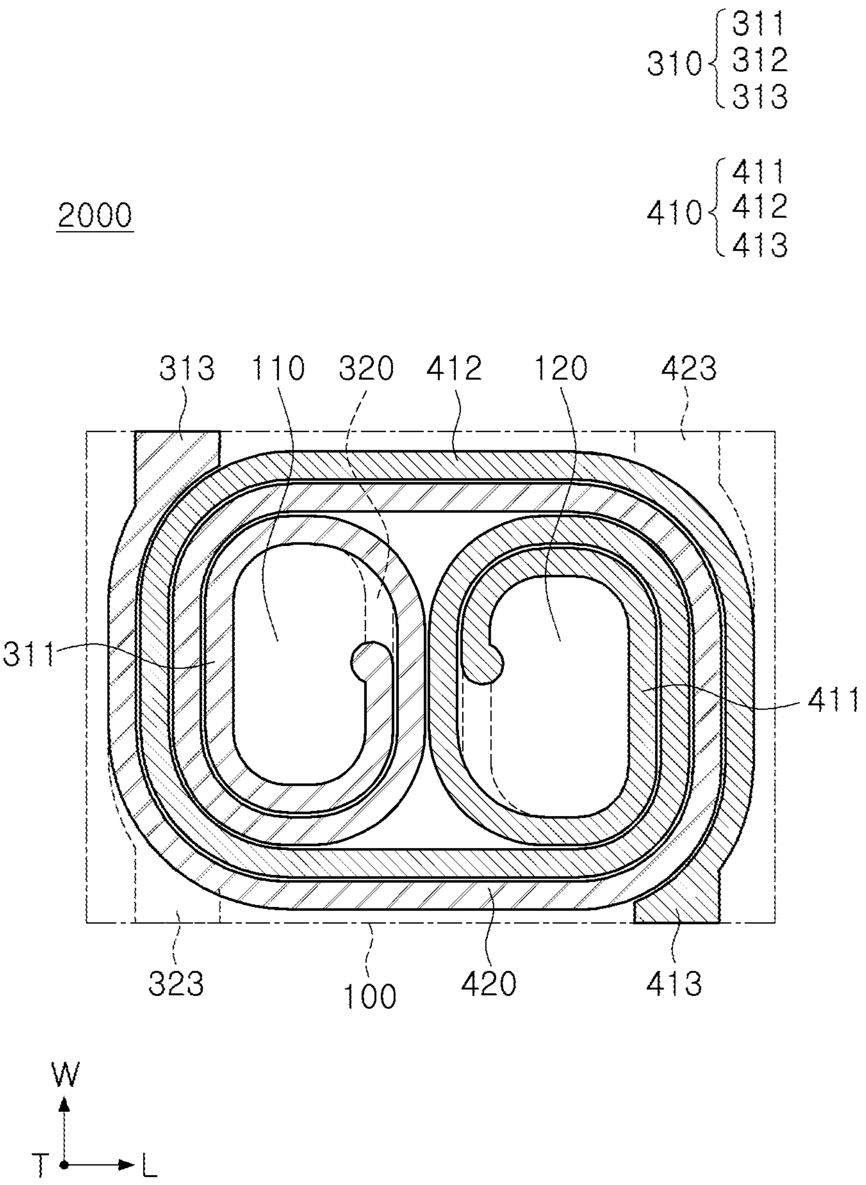
FIG. 4 is a view illustrating a coil component according to a second embodiment of the present disclosure, when viewed from above.
Figure 5A:
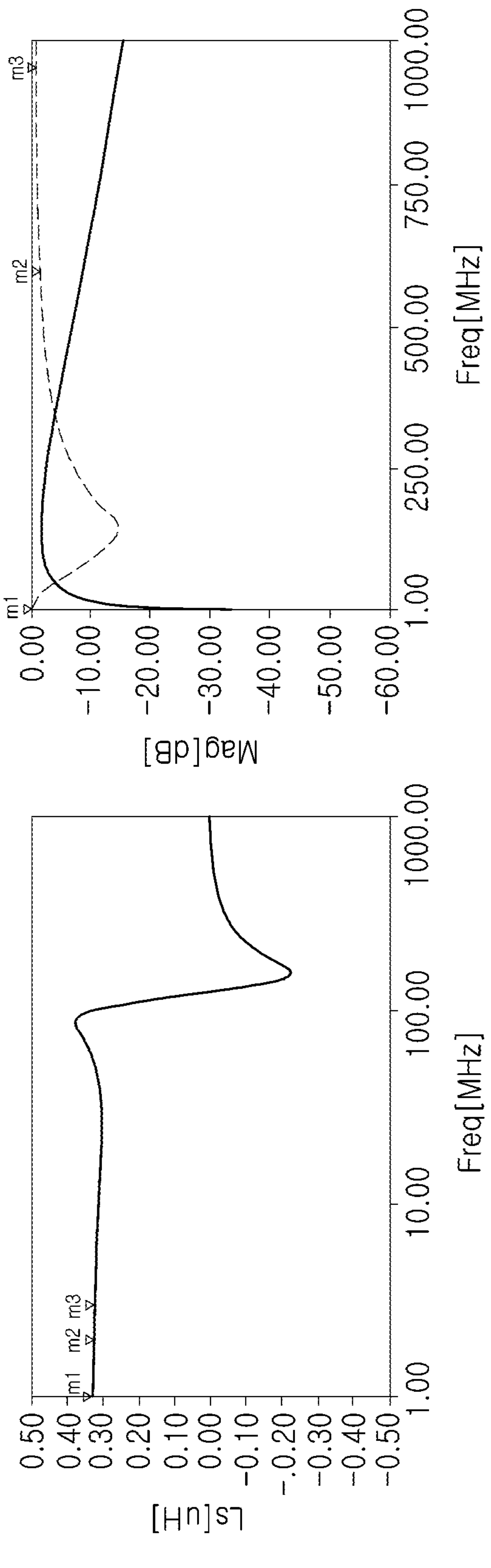
FIG. 5A is a graph illustrating a change in inductance for each frequency and transmission and reflection characteristics of a signal for each frequency, when a second coil portion of the coil component of FIG. 4 is open.
Figure 5B:
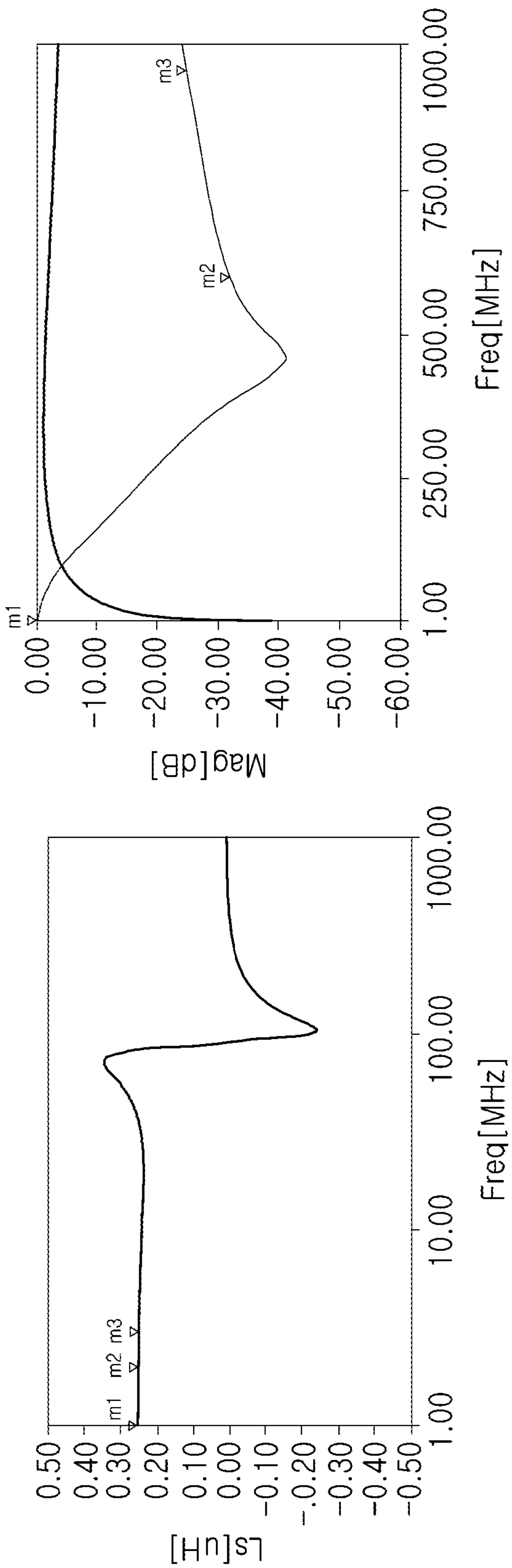
FIG. 5B is a graph illustrating a change in inductance for each frequency and transmission and reflection characteristics of a signal for each frequency, when a second coil portion of the coil component of FIG. 4 is short-circuited with a ground of a printed circuit board.
Figure 6:
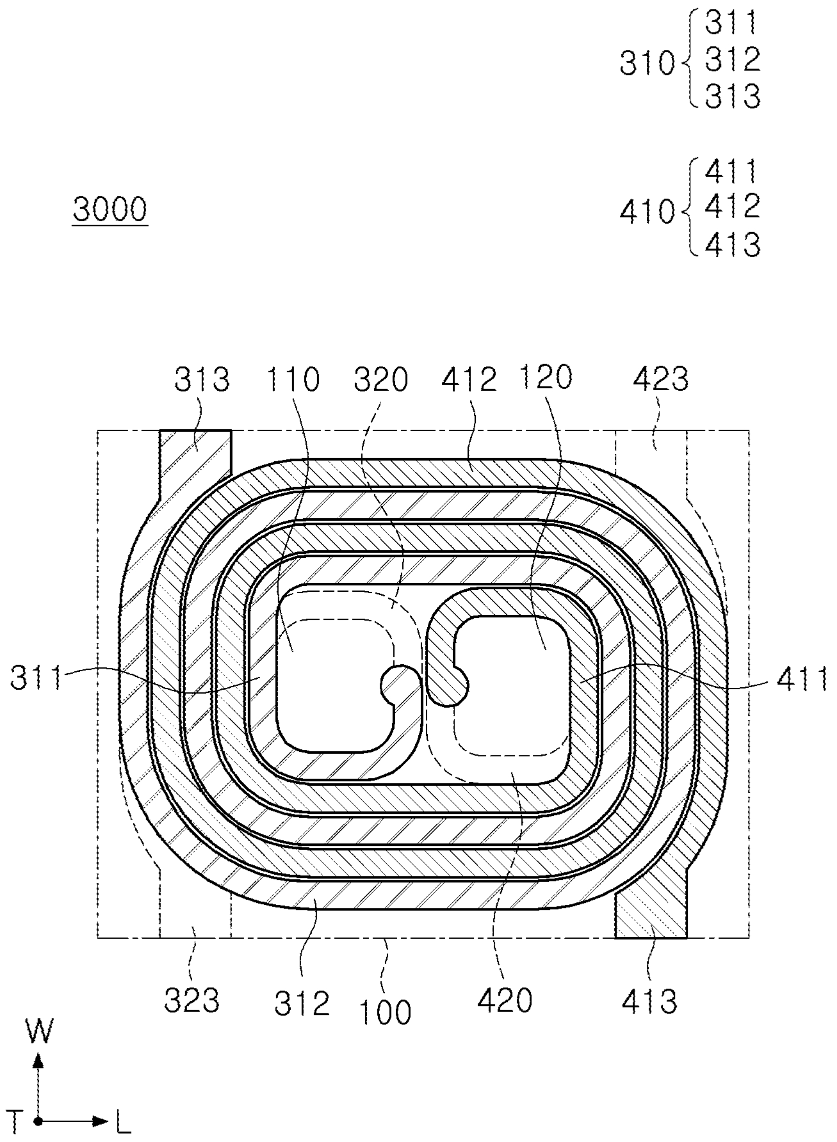
FIG. 6 is a view illustrating a coil component according to a third embodiment of the present disclosure, when viewed from above.
Figure 7A:
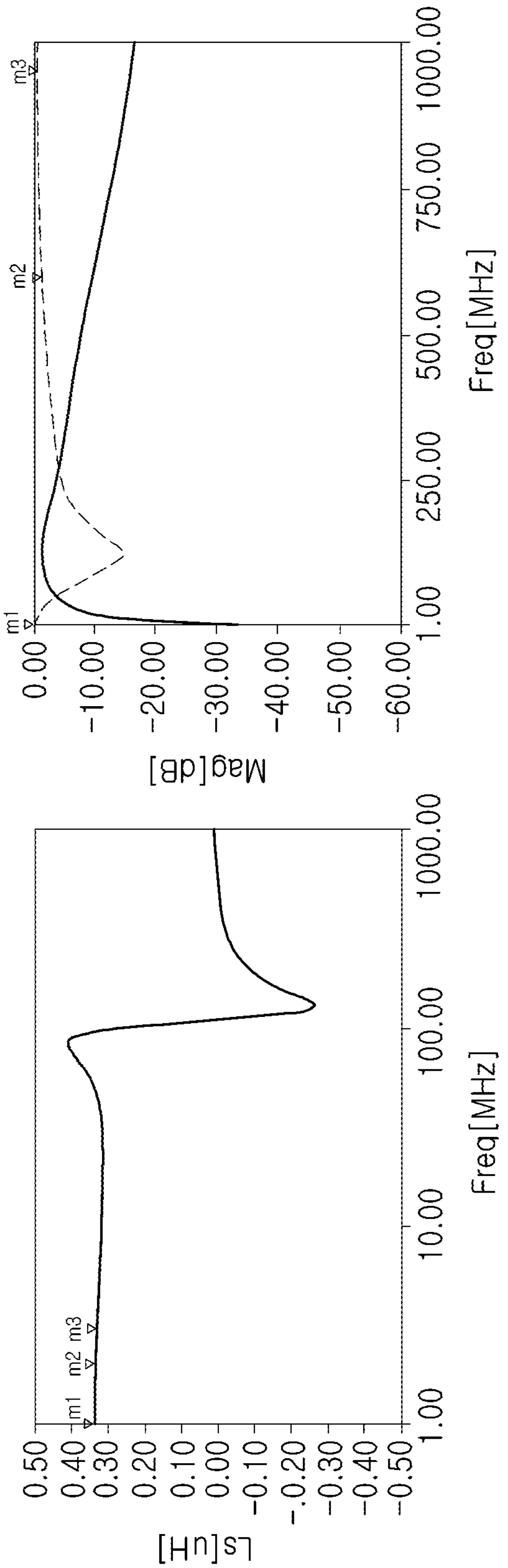
FIG. 7A is a graph illustrating a change in inductance for each frequency and transmission and reflection characteristics of a signal for each frequency, when a second coil portion of the coil component of FIG. 6 is open.
Figure 7B:
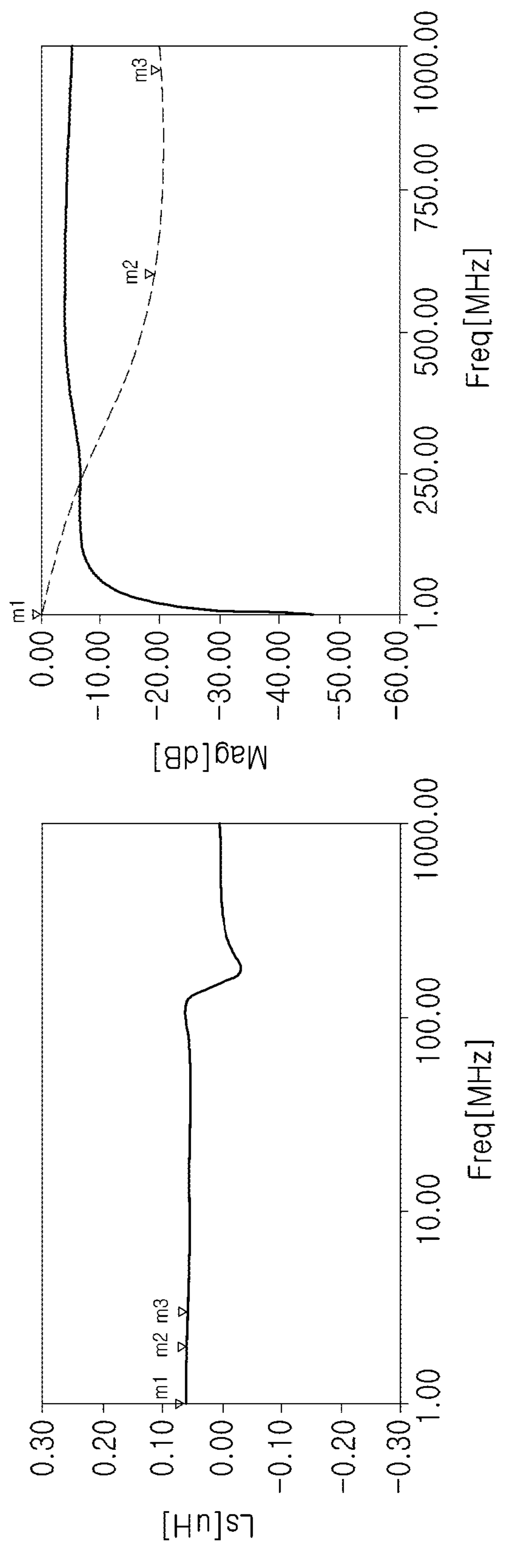
FIG. 7B is a graph illustrating a change in inductance for each frequency and transmission and reflection characteristics of a signal for each frequency, when a second coil portion of the coil component of FIG. 6 is short-circuited with a ground of a printed circuit board.

FIG. 4 is a view illustrating a coil component according to a second embodiment of the present disclosure, when viewed from above. FIG. 5A is a view illustrating a change in inductance for each frequency and transmission and reflection characteristics of a signal for each frequency, when a second coil portion of the coil component of FIG. 4 is open. FIG. 5B is a view illustrating a change in inductance for each frequency and transmission and reflection characteristics of a signal for each frequency, when a second coil portion of the coil component of FIG. 4 is short-circuited with a ground of a printed circuit board. FIG. 6 is a view illustrating a coil component according to a third embodiment of the present disclosure, when viewed from above. FIG. 7A is a view illustrating a change in inductance for each frequency and transmission and reflection characteristics of a signal for each frequency, when a second coil portion of the coil component of FIG. 6 is open. FIG. 7B is a view illustrating a change in inductance for each frequency and transmission and reflection characteristics of a signal for each frequency, when a second coil portion of the coil component of FIG. 6 is short-circuited with a ground of a printed circuit board.

Referring to FIGS. 1 to 2 and FIGS. 4 and 6, coil components 2000 and 3000 of second and third embodiments of the present disclosure increase absolute values of coupling coefficients of coil portions 300 and 400, as compared to the coil component 1000 according to the first embodiment of the present disclosure. For example, in the second embodiment of the present disclosure illustrated in FIG. 4, an overlapping area between turns of the first and second coil portions 300 and 400 may increase, as compared to the first embodiment of the present disclosure. In addition, in the third embodiment of the present disclosure illustrated in FIG. 6, an overlapping area between turns of the first and second coil portions 300 and 400 may increase, as compared to the second embodiment of the present disclosure. As a result, a coupling coefficient k between the first and second coil portions 300 and 400 may be −0.5 in the second embodiment and −0.9 in the third embodiment, respectively, to increase absolute values thereof, as compared to a coupling coefficient in the first embodiment of the present disclosure.

Table 3 below illustrates a change in inductance for each frequency of the first coil portion 300 when the second coil portion 400 is open (a left side view of FIG. 5A and a left side view of FIG. 7A), and illustrates a change in inductance for each frequency of the first coil portion 300 when the second coil portion 400 is short-circuited with the ground (a left side view of FIG. 5B and a left side view of FIG. 7B), in the second and third embodiments of the present disclosure in which coupling coefficients are −0.5 and −0.9, respectively.

Table 4 below illustrates signal transmission characteristics (S21) for each frequency of the first coil portion 300 when the second coil portion 400 is open (a dotted line in a right side view of FIG. 5A and a dotted line in a right side view of FIG. 7A), and illustrates signal transmission characteristics (S21) for each frequency of the first coil portion 300 when the second coil portion 400 is short-circuited with the ground (a dotted line in a right side view of FIG. 5B and a dotted line in a right side view of FIG. 7B), in the second and third embodiments of the present disclosure in which coupling coefficients are −0.5 and −0.9, respectively.

TABLE 3

| | | L (μH) | |
|---|---|---|---|
| | | Second Coil Portion (Open) | Second Coil Portion (Short-Circuited with Ground) |
| k = −0.5 | 1 MHZ (m1) | 0.3276 | 0.2459 |
| | 2 MHZ (m2) | 0.3246 | 0.2434 |
| | 3 MHZ (m3) | 0.3224 | 0.2413 |
| k = −0.9 | 1 MHZ (m1) | 0.3304 | 0.0606 |
| | 2 MHZ (m2) | 0.3266 | 0.0596 |
| | 3 MHZ (m3) | 0.3239 | 0.0587 |

TABLE 4

| | | S21 (dB) | |
|---|---|---|---|
| | | Second Coil Portion (Open) | Second Coil Portion (Short-Circuited with Ground) |
| k = −0.5 | 1 MHZ (m1) | −0.0094 | −0.0078 |
| | 600 MHZ (m2) | −1.4880 | −32.3099 |
| | 960 MHz (m3) | −0.9983 | −25.1621 |
| k = −0.9 | 1 MHZ (m1) | −0.0100 | −0.0068 |
| | 600 MHZ (m2) | −1.4408 | −18.8122 |
| | 960 MHz (m3) | −1.0215 | −19.9018 |

Referring to the left side views in FIGS. 5A, 5B, 7A, and 7B, and Table 3, it can be seen that capacitance of the coil component in a case in which the second coil portion 400 is short-circuited with the ground was slightly lowered at the same frequency, as compared to a case in which the second coil portion 400 is open. In addition, as magnetic coupling between the first and second coil portions 300 and 400, e.g., an absolute value of a coupling coefficient increases, in a case in which the second coil portion 400 is open and a case in which the second coil portion 400 is short-circuited with the ground, inductance decreases more at the same frequency.

Referring to the right side views in FIGS. 5A, 5B, 7A, and 7B, and Table 4, in the second and third embodiments, it can be seen that a high frequency signal of 500 MHz or higher of the coil component in a case in which the second coil portion 400 is short-circuited with the ground was not transmitted, as compared to a case in which the second coil portion 400 is open. Therefore, even in the embodiments, as described in the first embodiment of the present disclosure, high-frequency noise may be relatively easily removed by using a single array-type coil component.

Figure 8:
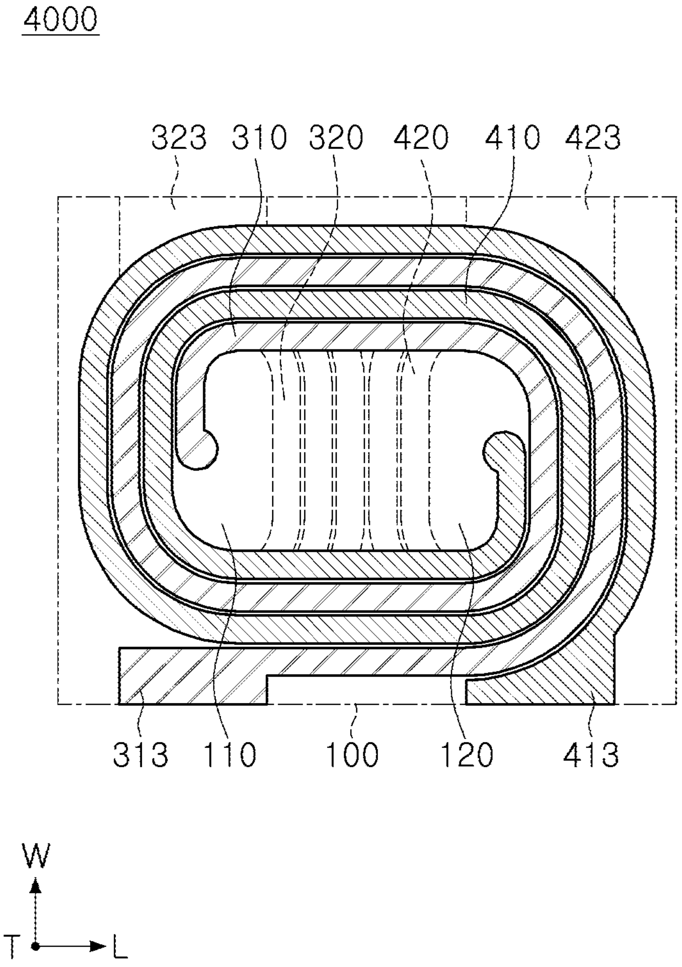
FIG. 8 is a view illustrating a coil component according to a fourth embodiment of the present disclosure, when viewed from above.
Figure 9A:
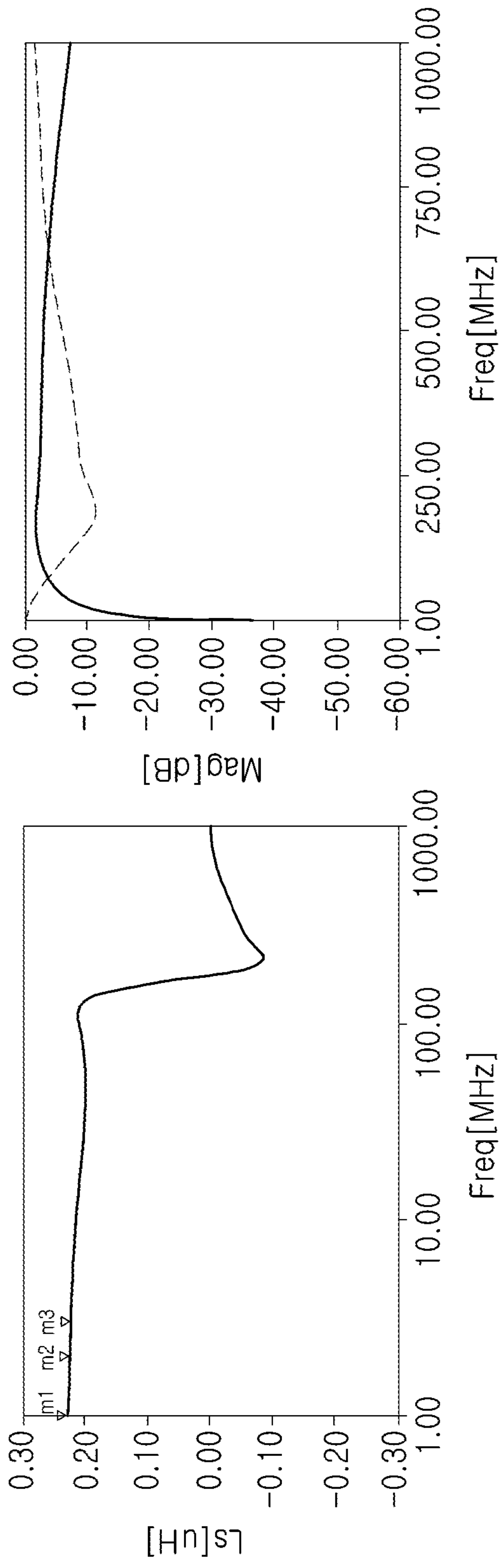
FIG. 9A is a graph illustrating a change in inductance for each frequency and transmission and reflection characteristics of a signal for each frequency, when a second coil portion of the coil component of FIG. 8 is open.
Figure 9B:
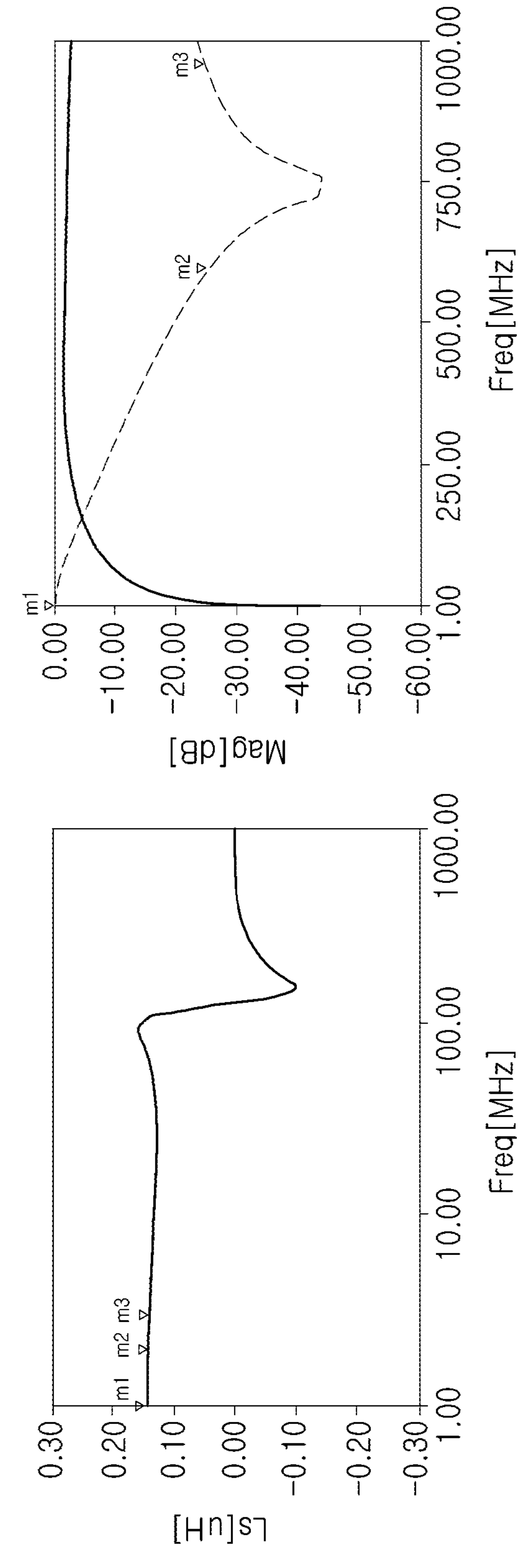
FIG. 9B is a graph illustrating a change in inductance for each frequency and transmission and reflection characteristics of a signal for each frequency, when a second coil portion of the coil component of FIG. 8 is short-circuited with a ground of a printed circuit board.

FIG. 8 is a view illustrating a coil component according to a fourth embodiment of the present disclosure, when viewed from above. FIG. 9A is a view illustrating a change in inductance for each frequency and transmission and reflection characteristics of a signal for each frequency, when a second coil portion of the coil component of FIG. 8 is open. FIG. 9B is a view illustrating a change in inductance for each frequency and transmission and reflection characteristics of a signal for each frequency, when a second coil portion of the coil component of FIG. 8 is short-circuited with a ground of a printed circuit board.

Referring to FIGS. 1 to 2 and 8, a coil component 4000 of a fourth embodiment of the present disclosure has a different arrangement of coil portions 300 and 400, as compared to the coil component 1000 according to the first embodiment of the present disclosure.

Specifically, in this embodiment, a winding portion may be formed only on first and second lower coil patterns on a lower surface of a support substrate 200, and an extended portion may be formed only on first and second upper coil patterns on an upper surface of the support substrate. For example, unlike in the first embodiment of the present disclosure, in this embodiment, first and second winding portions, respectively wound around first and second cores as axes, may be spaced apart from first and second extended portions wound around all of the first and second cores as an axis. Due to this structure, in the coil component according to this embodiment, a coupling coefficient k of the first and second coil portions 300 and 400 may have a positive value, for example, 0.7.

Table 5 below illustrates a change in inductance for each frequency of the first coil portion 300 when the second coil portion 400 is open (a left side view of FIG. 9A), and illustrates a change in inductance for each frequency of the first coil portion 300 when the second coil portion 400 is short-circuited with the ground (a left side view of FIG. 9B), in the fourth embodiment of the present disclosure in which a coupling coefficient is 0.7.

Table 6 below illustrates signal transmission characteristics (S21) for each frequency of the first coil portion 300 when the second coil portion 400 is open (a dotted line in a right side view of FIG. FIG. 9A), and illustrates signal transmission characteristics (S21) for each frequency of the first coil portion 300 when the second coil portion 400 is short-circuited with the ground (a dotted line in a right side view of FIG. 9B), in the fourth embodiment of the present disclosure in which a coupling coefficient is 0.7.

TABLE 5

| | L (μH) | |
|---|---|---|
| | Second Coil Portion (Open) | Second Coil Portion (Short-Circuited with Ground) |
| 1 MHZ (m1) | 0.2248 | 0.1443 |
| 2 MHZ (m2) | 0.2221 | 0.1420 |
| 3 MHZ (m3) | 0.2198 | 0.1402 |

TABLE 6

| | S21 (dB) | |
|---|---|---|
| | Second Coil Portion (Open) | Second Coil Portion (Short-Circuited with Ground) |
| 1 MHZ (m1) | −0.012 | −0.0093 |
| 600 MHZ (m2) | −1.3257 | −25.9635 |
| 960 MHZ (m3) | −0.9557 | −24.7559 |

Referring to the left side views in FIGS. 9A and 9B, it can be seen that capacitance of the coil component in a case in which the second coil portion 400 is short-circuited with the ground was slightly lowered at the same frequency, as compared to a case in which the second coil portion 400 is open.

Referring to the right side views in FIGS. 9A and 9B, and Table 6, it can be seen that a high frequency signal of 500 MHz or higher of the coil component in a case in which the second coil portion 400 is short-circuited with the ground was not transmitted, as compared to a case in which the second coil portion 400 is open. Therefore, even in the embodiments, as described in the first embodiment of the present disclosure, high-frequency noise may be relatively easily removed by using a single array-type coil component.

Figure 10:
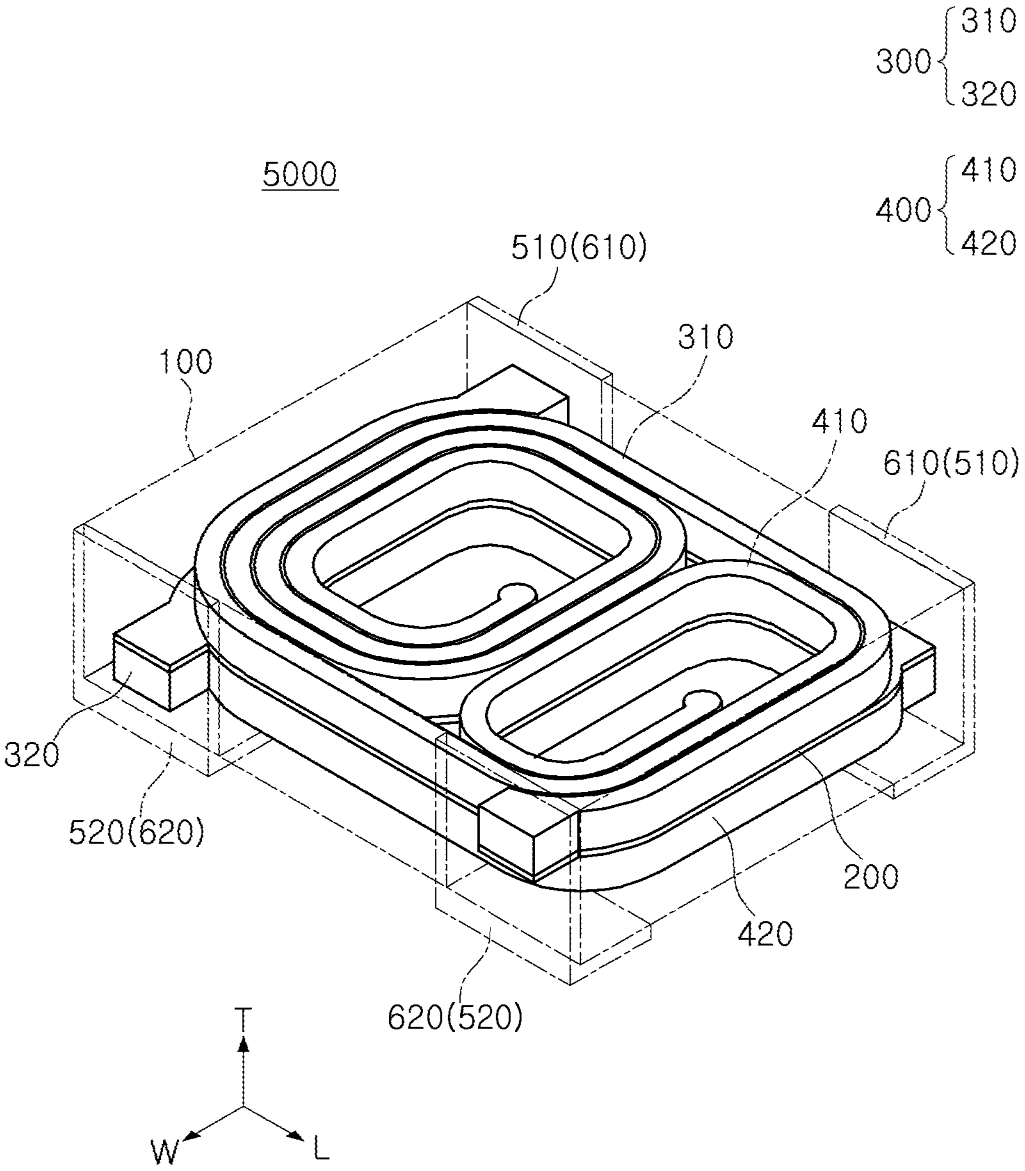
FIG. 10 is a view illustrating a coil component according to a fifth embodiment of the present disclosure.
Figure 11A:
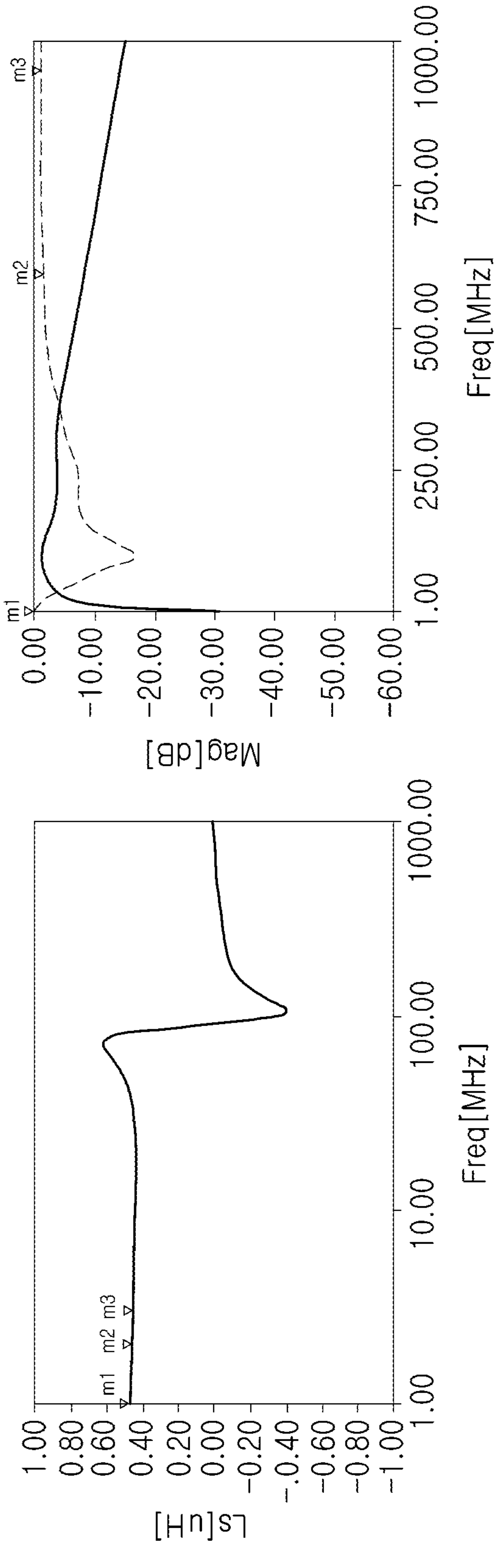
FIG. 11A is a graph illustrating a change in inductance for each frequency and transmission and reflection characteristics of a signal for each frequency, when a second coil portion of the coil component of FIG. 10 is open.
Figure 11B:
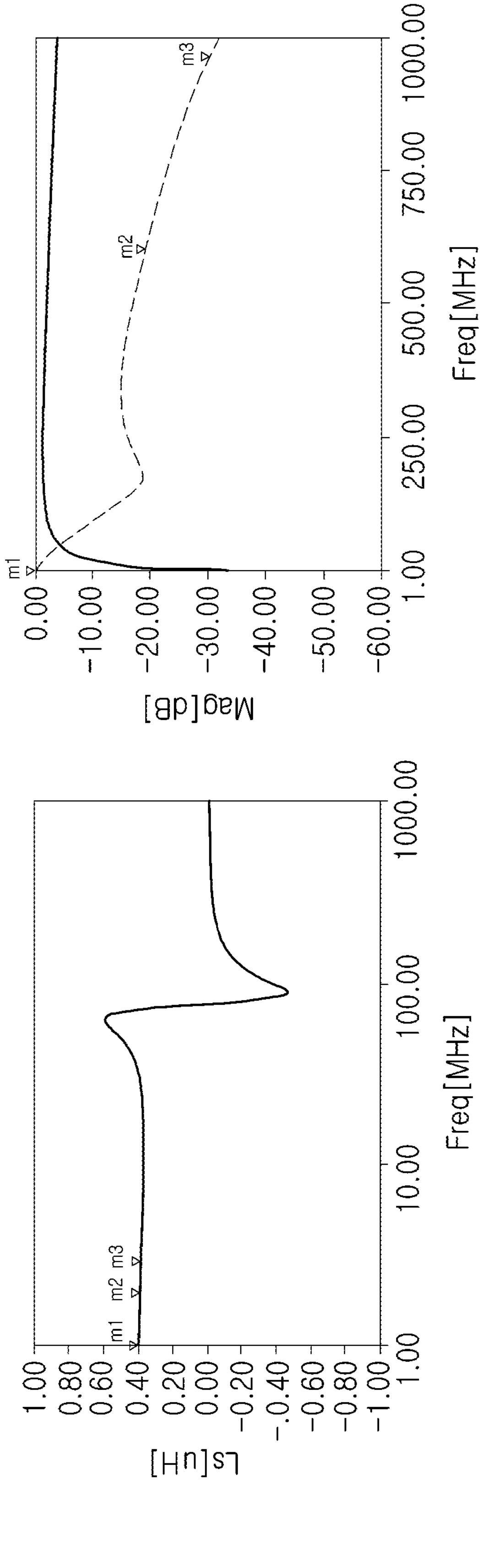
FIG. 11B is a graph illustrating a change in inductance for each frequency and transmission and reflection characteristics of a signal for each frequency, when a second coil portion of the coil component of FIG. 10 is short-circuited with a ground of a printed circuit board.
Figure 12A:
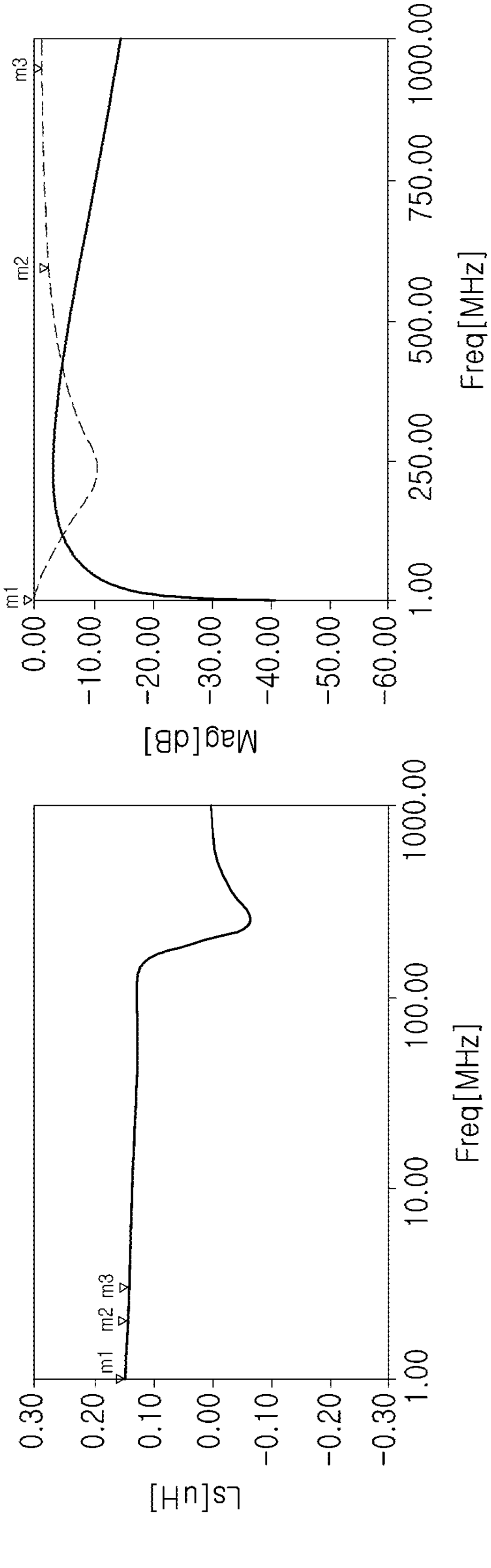
FIG. 12A is a graph illustrating a change in inductance for each frequency and transmission and reflection characteristics of a signal for each frequency, when a first coil portion of the coil component of FIG. 10 is open.
Figure 12B:
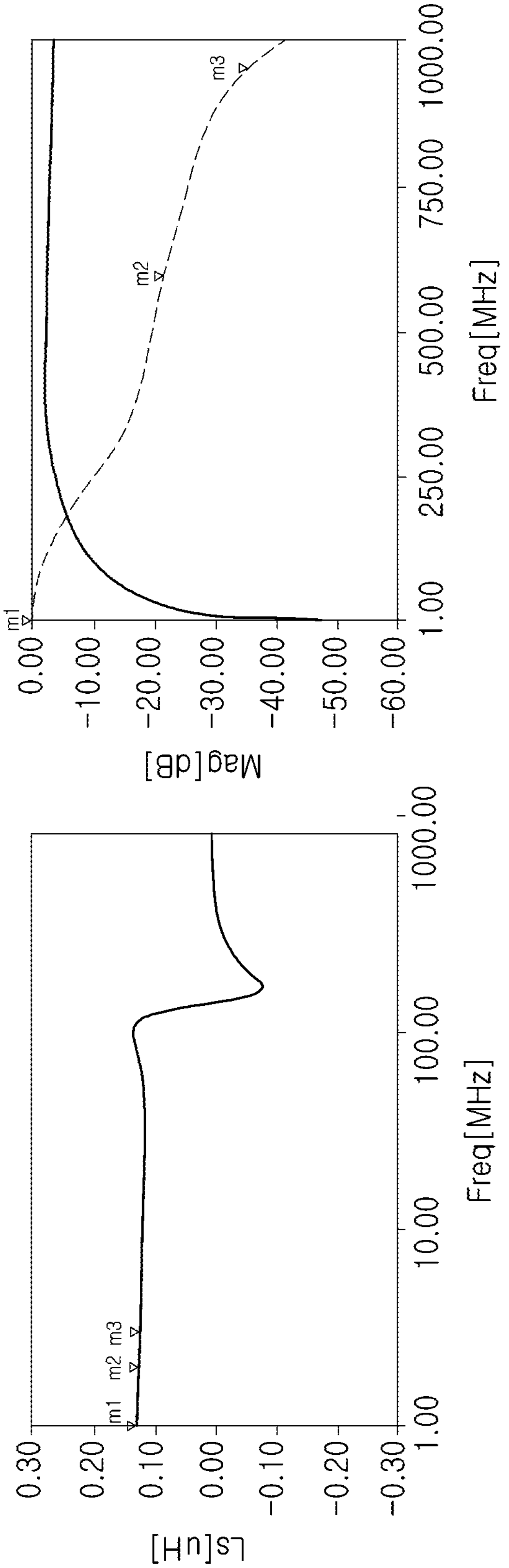
FIG. 12B is a graph illustrating a change in inductance for each frequency and transmission and reflection characteristics of a signal for each frequency, when a first coil portion of the coil component of FIG. 10 is short-circuited with a ground of a printed circuit board.

FIG. 10 is a view illustrating a coil component according to a fifth embodiment of the present disclosure. FIG. 11A is a view illustrating a change in inductance for each frequency and transmission and reflection characteristics of a signal for each frequency, when a second coil portion of the coil component of FIG. 10 is open. FIG. 11B is a view illustrating a change in inductance for each frequency and transmission and reflection characteristics of a signal for each frequency, when a second coil portion of the coil component of FIG. 10 is short-circuited with a ground of a printed circuit board. FIG. 12A is a view illustrating a change in inductance for each frequency and transmission and reflection characteristics of a signal for each frequency, when a first coil portion of the coil component of FIG. 10 is open. FIG. 12B is a view illustrating a change in inductance for each frequency and transmission and reflection characteristics of a signal for each frequency, when a first coil portion of the coil component of FIG. 10 is short-circuited with a ground of a printed circuit board.

Referring to FIG. 10, in this embodiment, first and second coil portions have different magnetic inductance, unlike in the first to fourth embodiments. As an example, as illustrated in FIG. 10, lengths of conductors of first and second coil portions 300 and 400 may be different, and the number of turns of winding portions wound around first and second cores may be different. For example, in each of the first to fourth embodiments, the first and second coil portions 300 and 400 were formed symmetrically, and the cross-sectional areas of the first and second cores 110 and 120 were formed substantially the same. The above configurations were not formed in this embodiment.

Table 7 below illustrates a change in inductance for each frequency of the first coil portion 300 when the second coil portion 400, having relatively small capacitance, is open (a left side view of FIG. 11A), and illustrates a change in inductance for each frequency of the first coil portion 300 when the second coil portion 400 is short-circuited with the ground (a left side view of 11B), in the fifth embodiment of the present disclosure. In addition, in the fifth embodiment of the present disclosure, Table 7 below illustrates a change in inductance for each frequency of the first coil portion 300 when the second coil portion 400, having relatively large capacitance, is open (a left side view of FIG. 12A), and illustrates a change in inductance for each frequency of the first coil portion 300 when the second coil portion 400 is short-circuited with the ground (a left side view of FIG. 12B).

Table 8 below illustrates signal transmission characteristics (S21) for each frequency of the first coil portion 300 when the second coil portion 400, having relatively small capacitance, is open (a dotted line in a right side view of FIG. 11A), and illustrates signal transmission characteristics (S21) for each frequency of the first coil portion 300 when the second coil portion 400 is short-circuited with the ground (a dotted line in a right side view of FIG. 11B) in this embodiment. In addition, Table 8 below illustrates signal transmission characteristics (S21) for each frequency of the second coil portion 400 when the first coil portion 300 is open (a dotted line in a right side view of FIG. 12A), and illustrates signal transmission characteristics (S21) for each frequency of the second coil portion 400 when the first coil portion 300 is short-circuited with the ground (a dotted line in a right side view of FIG. 12B).

TABLE 7

| | L (μH) | |
|---|---|---|
| | Second Coil Portion (Open) | Second Coil Portion (Short-Circuited with Ground) |
| 1 MHZ (m1) | 0.4669 | 0.4021 |
| 2 MHZ (m2) | 0.4615 | 0.3967 |
| 3 MHZ (m3) | 0.4573 | 0.3925 |

TABLE 7-continued

| | First Coil Portion (Open) | First Coil Portion (Short-Circuited with Ground) |
|---|---|---|
| 1 MHZ (m1) | 0.1452 | 0.1256 |
| 2 MHZ (m2) | 0.1432 | 0.1235 |
| 3 MHZ (m3) | 0.1417 | 0.1220 |

TABLE 8

| | S21 (dB) | |
|---|---|---|
| | Second Coil Portion ( Open) | Second Coil Portion (Short-Circuited with Ground) |
| 1 MHZ (m1) | −0.0140 | −0.0129 |
| 600 MHZ (m2) | −1.6161 | −18.9880 |
| 960 MHZ (m3) | −0.9941 | −30.2704 |
| | First Coil Portion (Open) | First Coil Portion (Short-Circuited with Ground) |
| 1 MHZ (m1) | −0.0055 | −0.0054 |
| 600 MHZ (m2) | −2.2931 | −21.7660 |
| 960 MHZ (m3) | −1.2236 | −36.1381 |

Referring to FIGS. 11A, 11B, 12A, and 12B, and Tables 7 and 8, the first and second coil portions 300 and 400 having different magnetic inductances were formed, and any one of the first and second coil portions 300 and 400 may be selectively connected to the ground, depending on required noise removal performance, to more easily remove high-frequency noise.

Figure 13:
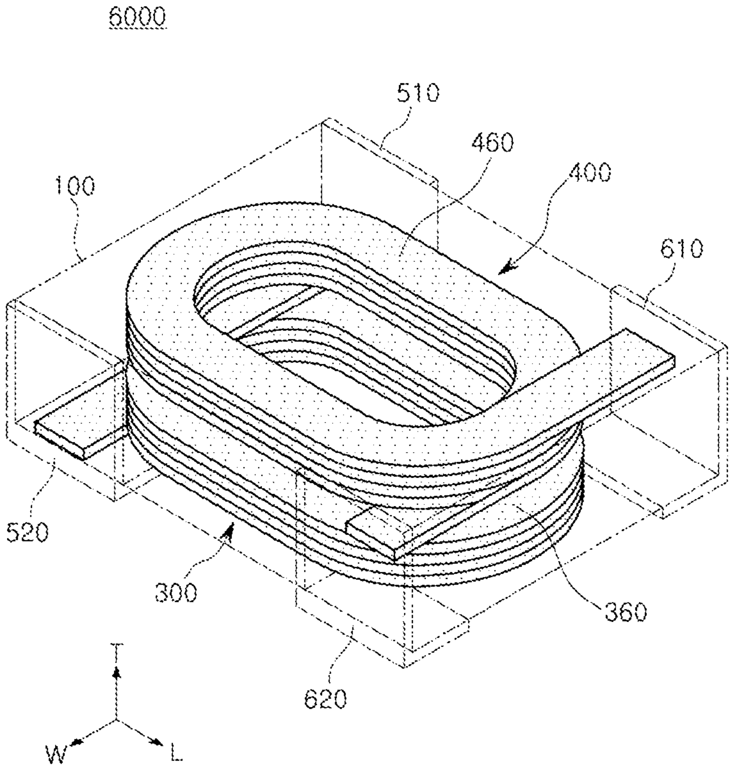
FIG. 13 a view schematically illustrating a coil component according to a sixth embodiment of the present disclosure.
Figure 14A:
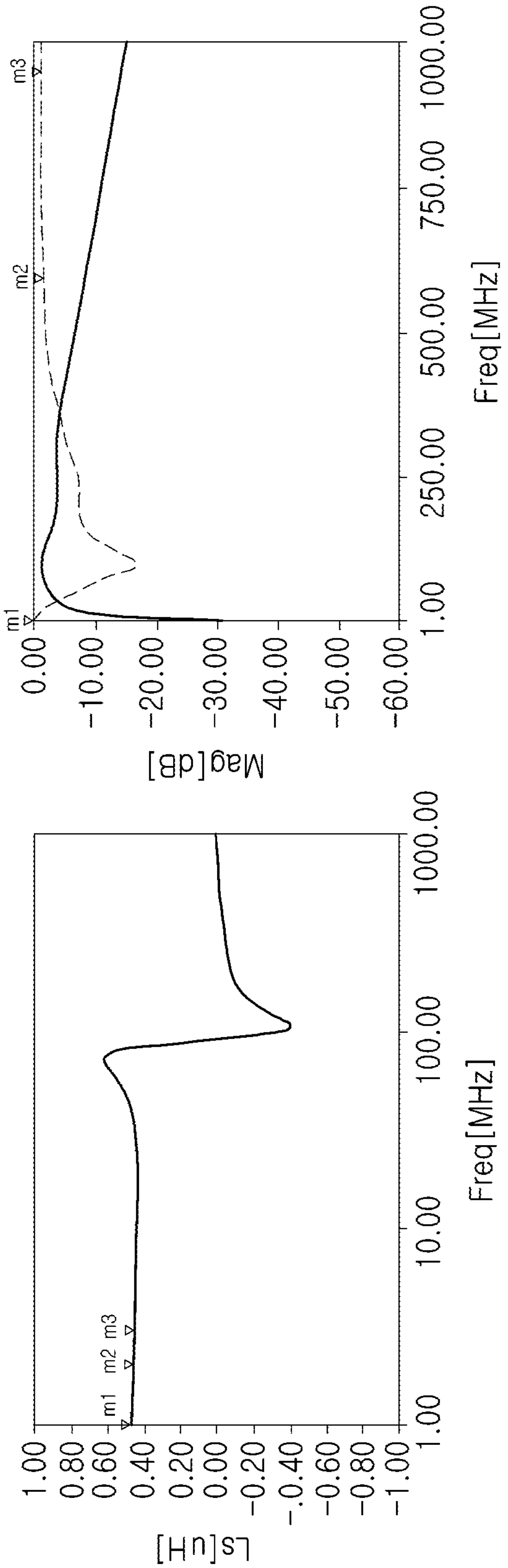
FIG. 14A is a graph illustrating a change in inductance for each frequency and transmission and reflection characteristics of a signal for each frequency, when a second coil portion of the coil component of FIG. 13 is open.
Figure 14B:
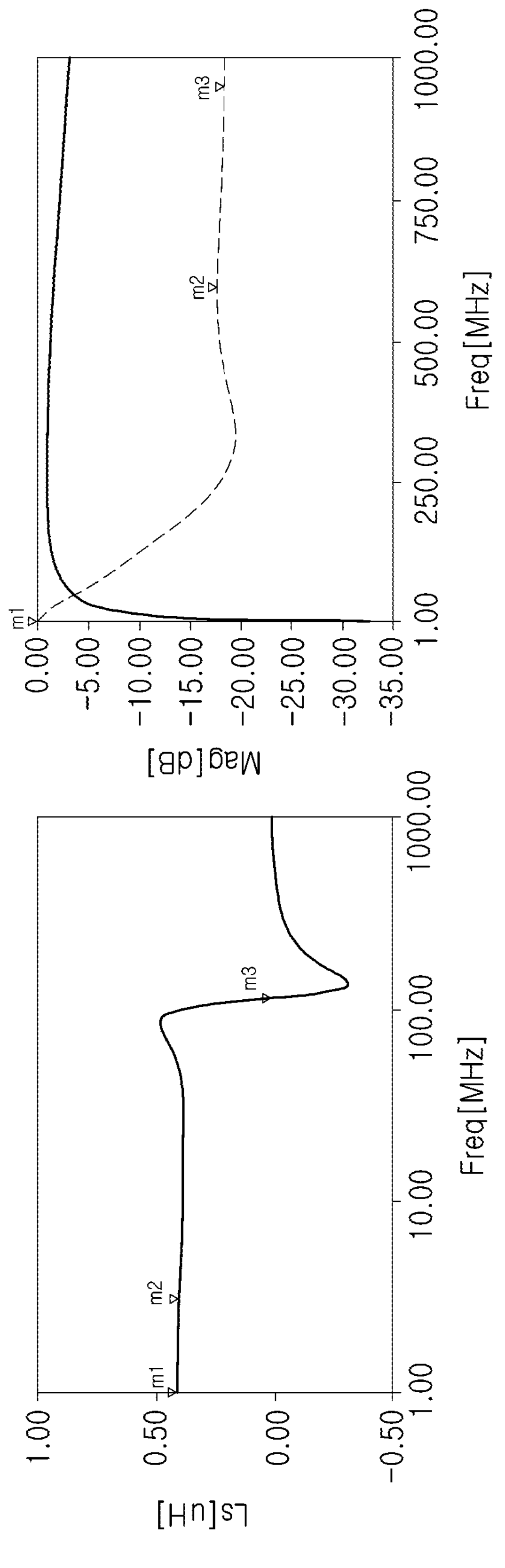
FIG. 14B is a graph illustrating a change in inductance for each frequency and transmission and reflection characteristics of a signal for each frequency, when a second coil portion of the coil component of FIG. 13 is short-circuited with a ground of a printed circuit board.

FIG. 13 a view schematically illustrating a coil component according to a sixth embodiment of the present disclosure. FIG. 14A is a view illustrating a change in inductance for each frequency and transmission and reflection characteristics of a signal for each frequency, when a second coil portion of the coil component of FIG. 13 is open. FIG. 14B is a view illustrating a change in inductance for each frequency and transmission and reflection characteristics of a signal for each frequency, when a second coil portion of the coil component of FIG. 13 is short-circuited with a ground of a printed circuit board.

Referring to FIG. 13, unlike in the first to fifth embodiments, this embodiment did not include a support substrate, and first and second coil portions 300 and 400 were prepared to form a coiling type coil. For example, each of the first and second coil portions 300 and 400 may be formed by winding a metal wire, of which surface is covered with a coating layer of an insulating material. As an example, the metal wire may be a copper wire in which a coating layer 360, 460 and a fusion layer 365, 465 are sequentially coated on a surface. The first and second coil portions 300 and 400 may be edge-wise windings or alpha windings.

In addition, in this embodiment, unlike in the first to fifth embodiments, the first and second coil portions 300 and 400 may be spaced apart from each other in the thickness direction of the body 100, and a core 100 of the body 100 may be formed to pass through central portions of the first and second coil portions 300 and 400.

Table 9 below illustrates a change in inductance for each frequency of the first coil portion 300 when the second coil portion 400 is open (a left side view of FIG. 14A), and illustrates a change in inductance for each frequency of the first coil portion 300 when the second coil portion 400 is short-circuited with the ground (a left side view of FIG. 14B), in this embodiment in which the first and second coil portions 300 and 400 are winding-type coils.

Table 10 below illustrates signal transmission characteristics (S21) for each frequency of the first coil portion 300 when the second coil portion 400 is open (a dotted line in a right side view of FIG. 14A), and illustrates signal transmission characteristics (S21) for each frequency of the first coil portion 300 when the second coil portion 400 is short-circuited with the ground (a dotted line in a right side view in FIG. 14B), in this embodiment in which the first and second coil portions 300 and 400 are winding-type coils.

TABLE 9

| | L (pH) | |
|---|---|---|
| | Second Coil Portion (Open) | Second Coil Portion (Short-Circuited with Ground) |
| 1 MHZ (m1) | 0.4491 | 0.3927 |
| 2 MHZ (m2) | 0.4430 | 0.3891 |
| 3 MHZ (m3) | 0.1155 | 0.0008 |

TABLE 10

| | S21 (dB) | |
|---|---|---|
| | Second Coil Portion (Open) | Second Coil Portion (Short-Circuited with Ground) |
| 1 MHZ (m1) | −0.0117 | −0.0099 |
| 600 MHZ (m2) | −3.2810 | −17.9912 |
| 960 MHZ (m3) | −1.9781 | −18.7347 |

Referring to FIGS. 14A and 14B and Tables 9 and in a similar manner to the first to fifth embodiments of the present disclosure, in this embodiment in which the first and second coil portions 300 and 400 are winding-type coils, the second coil portion 400, among the first and second coil portions 300 and 400, may be short-circuited with a ground, to remove a high frequency noise signal with only a single component without using a separate noise filter, etc.

(Mounting Board of Coil Component)

Figure 15:
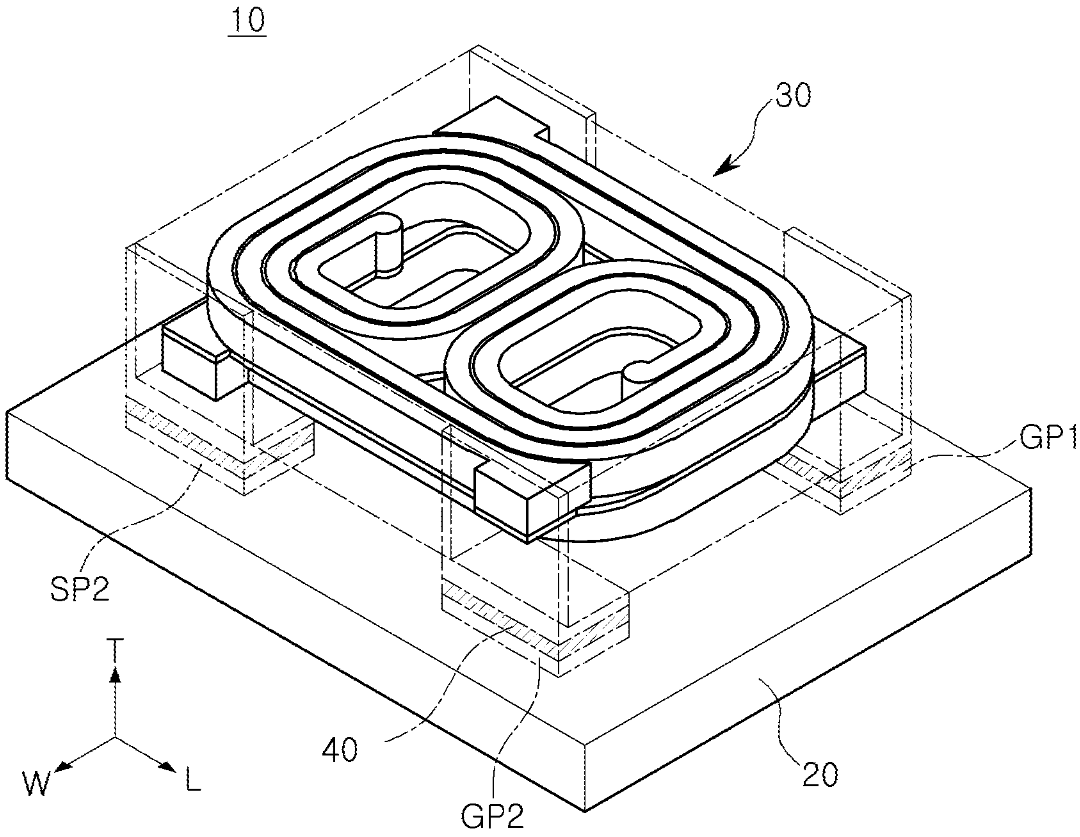
FIG. 15 is a view illustrating a mounting board of a coil component according to an embodiment of the present disclosure.

FIG. 15 is a view illustrating a mounting board of a coil component according to an embodiment of the present disclosure.

Referring to FIG. 15, a mounting board 10 of a coil component according to an embodiment of the present disclosure may include a printed circuit board 20 including a ground pad and a signal pad thereon, a coil component 30 installed on the printed circuit board 20, and a solder 40 connecting each of the ground pad and the signal pad to the coil component 30.

A mounting board 10 of a coil component according to this embodiment may include a printed circuit board 20 on which a coil component 30 is mounted, and two or more signal pads SP1 and SP2 formed on an upper surface of the printed circuit board 20, and two or more ground pads GP1 and GP2 formed on the upper surface of the printed circuit board 20. Since the coil component 30 has been described in the first to sixth embodiments of the present disclosure, detailed descriptions will be omitted.

The signal pads SP1 and SP2 may be connected to first and second external electrodes 510 and 520 of the coil component 30 by the solder 40. The signal pads SP1 and SP2 may be connected to signal wiring lines formed on the printed circuit board 20. The ground pads GP1 and GP2 may be connected to first and second ground electrodes 610 and 620 of the coil component 30 by the solder 40. The ground pads GP1 and GP2 may be connected to a ground formed on the printed circuit board 20.

According to the present disclosure, high-frequency noise may be easily removed from the coil component of the array type.

While example embodiments have been illustrated and described above, it will be apparent to those skilled in the art that modifications and variations could be made without departing from the scope of the present disclosure as defined by the appended claims.

What is claimed is:

1. A coil component comprising:

a body including a support member having an upper surface and a lower surface;

first and second coil portions spaced apart from each other and each having an upper coil pattern on disposed on the upper surface of the support member and a lower coil pattern disposed on the lower surface of the support member;

first and second external electrodes disposed on the body to be spaced apart from each other and connected to both ends of the first coil portion; and first and second ground electrodes spaced apart from each other on the body and connected to both ends of the second coil portion, wherein the body has first and second cores spaced apart from each other, and each of the upper coil pattern and the lower coil pattern of the first coil portion has a first winding portion wound around the first core and a first extended portion surrounding the first and second cores.

2. The coil component of claim 1, wherein a winding direction of the first winding portion and a winding direction of the first extended portion are the same, and a winding direction of the second winding portion and a winding direction of the second extended portion are the same.

3. The coil component of claim 1, wherein each of the first and second coil portions comprises a seed layer disposed on the support substrate and a plating layer disposed on the seed layer.

4. The coil component of claim 1, wherein the first coil portion comprises a first upper coil pattern disposed on a first surface of the support substrate, a first lower coil pattern disposed on a second surface of the support substrate opposing the first surface of the support substrate, and a first via passing through the support substrate and connecting the first upper coil pattern and the first lower coil pattern, and the second coil portion comprises a second upper coil pattern disposed on the first surface of the support substrate to be spaced apart from the first upper coil pattern, and a second lower coil pattern disposed on the second surface of the support substrate to be spaced apart from the first lower coil pattern, and a second via passing through the support substrate and connecting the second upper coil pattern and the second lower coil pattern.

5. The coil component of claim 4, wherein the first winding portion and the first extended portion are disposed on the first upper coil pattern and the first lower coil pattern, respectively, and the second winding portion and the second extended portion are disposed on the second upper coil pattern and the second lower coil pattern, respectively.

6. The coil component of claim 4, wherein the first and second winding portions are disposed on the first and second lower coil patterns, and the first and second extended portions are disposed on the first and second upper coil patterns.

7. The coil component of claim 1, wherein each of the first and second coil portions is a wound coil comprising a metal wire having a coating layer disposed thereon.

8. The coil component of claim 7, wherein the first and second coil portions are spaced apart from each other in a thickness direction of the body, the body comprises a core passing through a central portion of each of the first and second coil portions.

9. A board having a coil component mounted thereon, comprising:

a printed circuit board including a ground pad and a signal pad; and a coil component disposed on the printed circuit board, wherein the coil component comprises:

a body including a support member having a first surface and a second surface opposing the first surface, the support member comprising a first through-hole and a second through-hole spaced apart from the first through-hole;

first and second coil portions spaced apart from each other in the body and each having at least one coil pattern disposed on one of the first surface and/or the second surface of the support member;

first and second external electrodes disposed on the body to be spaced apart from each other and connecting both ends of the first coil portion and the signal pad; and first and second ground electrodes spaced apart from each other on the body and connecting both ends of the second coil portion and the ground pad, wherein the at least one coil pattern comprises at least one turn surrounding the first through-hole at least one turn surrounding both the first and the second through-holes.

10. A coil component, comprising:

a support member having a first surface and a second surface opposing the first surface;

a first core and a second core spaced apart from the first core;

a first coil portion having a first winding portion wound around the first core and a first extension portion wound around the first and second cores, the first coil portion having opposing ends connected to first and second external electrodes which are spaced apart from each other;

a second coil portion having a second winding portion wound around the second core and a second extension portion wound around the first and second cores, the second coil portion having opposing ends connected to first and second ground electrodes which are spaced apart from each other and from the first and second external electrodes, wherein the first winding portion and the first extension portion are both disposed on at least one of the first surface and the second surface of the support member.

11. The coil component of claim 10, wherein the first extension portion is wound around the second winding portion and the second extension portion is wound around the first winding portion.

12. The coil component of claim 10, wherein a winding direction of the first winding portion and a winding direction of the second winding portion are opposite each other.

13. The coil component of claim 10, wherein the first winding portion comprises a first upper winding portion disposed on an upper surface of a support substrate and a first lower winding portion disposed on a lower surface of the support substrate, the first upper winding portion and the first lower winding portion being connected by a first via penetrating the support substrate, and the second winding portion comprises a second upper winding portion disposed on the upper surface of the support substrate and a second lower winding portion disposed on the lower surface of the support substrate, the second upper winding portion and the second lower winding portion being connected by a second via penetrating the support substrate.

14. The coil component of claim 13, wherein a first end of each of the first and second coil portions is disposed above the support substrate and a second end of each of the first and second coil portions is disposed below the support substrate.

15. The coil component of claim 10, wherein each of the first and second winding portions comprises one turn around a corresponding core and each of the first and second extension portions comprises a plurality of turns around the first and second cores.

16. The coil component of claim 10, wherein the first and second coil portions are negatively coupled and have a coupling coefficient in a range from −1 to 0.

17. The coil component of claim 10, wherein the first and second coil portions are positively coupled and have a coupling coefficient in a range from 0 to 1.

18. The coil component of claim 10, wherein second winding portion and the second extension portion are both disposed on at least one of the first surface and the second surface of the support member.

19. The coil component of claim 1, wherein each of the upper coil pattern and the lower coil pattern of the second coil portion has a second winding portion wound around the second core and a second extended portion surrounding the first and second cores.

* * * * *